(12) United States Patent
Pederson et al.

(10) Patent No.: US 11,824,586 B2
(45) Date of Patent: Nov. 21, 2023

(54) NETWORK SECURITY AND VARIABLE PULSE WAVE FORM WITH CONTINUOUS COMMUNICATION

(71) Applicant: Federal Law Enforcement Development Services, Inc., St. Cloud, MN (US)

(72) Inventors: Felicity-John C. Pederson, St. Cloud, MN (US); Timothy J. Vogt, Sartell, MN (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

(21) Appl. No.: 18/094,945

(22) Filed: Jan. 9, 2023

(65) Prior Publication Data

US 2023/0155686 A1    May 18, 2023

Related U.S. Application Data

(60) Continuation of application No. 17/323,601, filed on May 18, 2021, now Pat. No. 11,552,712, which is a continuation of application No. 16/936,765, filed on Jul. 23, 2020, now Pat. No. 11,018,774, which is a continuation of application No. 16/242,531, filed on
(Continued)

(51) Int. Cl.
*H04B 10/524* (2013.01)
*H04B 10/116* (2013.01)
*H04B 10/50* (2013.01)
*H04B 10/40* (2013.01)

(52) U.S. Cl.
CPC ......... *H04B 10/524* (2013.01); *H04B 10/116* (2013.01); *H04B 10/40* (2013.01); *H04B 10/502* (2013.01)

(58) Field of Classification Search
CPC .... H04B 10/524; H04B 10/116; H04B 10/40; H04B 10/502
See application file for complete search history.

(56) References Cited

U.S. PATENT DOCUMENTS

| 700,678 A | 5/1902 | Downie |
|---|---|---|
| 2,082,279 A | 6/1937 | Fore |

(Continued)

FOREIGN PATENT DOCUMENTS

| AU | 2006201345 | 10/2007 |
|---|---|---|
| AU | 2007202909 | 2/2008 |

(Continued)

OTHER PUBLICATIONS

Komine T. et al., "Integrated System of White LED Visible-Light Communication and Power-Line Communication," Sep. 15, 2002; Sep. 15, 2002-Sep. 18, 2002, vol. 4, Sep. 15, 2002, pp. 1762-1766.
(Continued)

*Primary Examiner* — Casey L Kretzer
(74) *Attorney, Agent, or Firm* — Edwin E. Voigt, II

(57) ABSTRACT

A pulsed light communication device has a plurality of indicator light emitting diodes emitting diodes emitting at least one of a plurality of wavelengths of colored light to correspond to a designated color assigned to a security level for a network. A continuous uninterrupted modulated pulsed light emitting diode light signal may be generated having a sensitivity threshold detection level exceeding minimal parameters of a photodetector.

12 Claims, 8 Drawing Sheets

DUTY CYCLE GRAPH
DIMMING

Related U.S. Application Data

Jan. 8, 2019, now abandoned, which is a continuation of application No. 15/042,843, filed on Feb. 12, 2016, now Pat. No. 10,205,530, which is a division of application No. 14/270,670, filed on May 6, 2014, now Pat. No. 9,455,783.

(60) Provisional application No. 61/819,861, filed on May 6, 2013.

(56) References Cited

U.S. PATENT DOCUMENTS

| | | |
|---|---|---|
| 3,469,686 A | 9/1969 | Gutsche et al. |
| 3,696,384 A | 10/1972 | Lester |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | Springthorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,732,310 A | 3/1988 | Umeha |
| 4,742,432 A | 5/1988 | Thillays |
| 4,785,463 A | 11/1988 | Janc |
| 4,799,135 A | 1/1989 | Inukai |
| 4,821,118 A | 4/1989 | Lafreniere |
| 4,821,338 A | 4/1989 | Naruse |
| 4,848,923 A | 7/1989 | Ziegler |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,099,346 A | 3/1992 | Lee |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | Vandulmen |
| 5,245,681 A | 9/1993 | Guignard |
| 5,247,380 A | 9/1993 | Lee |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,495,358 A | 2/1996 | Bartig |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,566,022 A | 10/1996 | Segev |
| 5,567,036 A | 10/1996 | Theobald |
| 5,568,406 A | 10/1996 | Gerber |
| 5,569,939 A | 10/1996 | Choi |

(56) References Cited

U.S. PATENT DOCUMENTS

| | | |
|---|---|---|
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | Deplaen |
| 5,612,231 A | 3/1997 | Holm |
| 5,619,373 A | 4/1997 | Meyerhofer |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | Vannrox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,710,833 A | 1/1998 | Moghaddam |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,737,060 A | 4/1998 | Kasha, Jr. |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,783,909 A | 7/1998 | Hochstein |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,064,303 A | 5/2000 | Klein |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,084,555 A | 7/2000 | Mizoguchi |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,097,543 A | 8/2000 | Rallison |
| 6,102,696 A | 8/2000 | Osterwalder |
| 6,104,107 A | 8/2000 | Avramenko |
| 6,106,137 A | 8/2000 | Adams |
| 6,107,918 A | 8/2000 | Klein |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,137,613 A | 10/2000 | Ushirozawa |
| 6,159,005 A | 12/2000 | Herold |
| 6,160,666 A | 12/2000 | Rallison |
| 6,166,496 A | 12/2000 | Lys |
| 6,177,678 B1 | 1/2001 | Brass |
| 6,181,805 B1 | 1/2001 | Koike |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |

(56) References Cited

U.S. PATENT DOCUMENTS

| | | |
|---|---|---|
| 6,452,572 B1 | 9/2002 | Fan |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,504,646 B1 | 1/2003 | Amoruso |
| 6,532,212 B1 | 3/2003 | Soloway |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,816,132 B2 | 11/2004 | Tanijiri |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,009,471 B2 | 3/2006 | Elmore |
| 7,023,469 B1 | 4/2006 | Olson |
| 7,046,160 B2 | 5/2006 | Pederson |
| 7,062,797 B2 | 6/2006 | Khulusi |
| 7,072,587 B2 | 7/2006 | Dietz |
| 7,102,665 B1 | 9/2006 | Chandler |
| 7,103,614 B1 | 9/2006 | Kucik |
| 7,178,941 B2 | 2/2007 | Roberge |
| 7,183,895 B2 | 2/2007 | Bazakos |
| 7,190,125 B2 | 3/2007 | McDonough |
| 7,224,326 B2 | 5/2007 | Sefton |
| 7,230,884 B2 | 6/2007 | Shemesh |
| 7,269,632 B2 | 9/2007 | Edeker |
| 7,289,731 B2 | 10/2007 | Thinguldstad |
| 7,309,965 B2 | 12/2007 | Dowling |
| 7,321,757 B2 | 1/2008 | Yamashita |
| 7,323,991 B1 | 1/2008 | Eckert |
| 7,324,757 B2 | 1/2008 | Wilson |
| 7,333,735 B1 | 2/2008 | Goorjian |
| 7,349,325 B2 | 3/2008 | Trzeciak |
| 7,352,972 B2 | 4/2008 | Franklin |
| 7,439,847 B2 | 10/2008 | Pederson |
| 7,439,874 B2 | 10/2008 | Sotiriou |
| 7,529,488 B2 | 5/2009 | Burdick |
| 7,548,698 B2 | 6/2009 | Yamamoto |
| 7,557,521 B2 | 7/2009 | Lys |
| 7,567,844 B2 | 7/2009 | Thomas |
| 7,570,246 B2 | 8/2009 | Maniam |
| 7,583,901 B2 | 9/2009 | Nakagawa |
| 7,607,798 B2 | 10/2009 | Panotopoulos |
| 7,689,130 B2 | 3/2010 | Ashdown |
| 7,715,723 B2 | 5/2010 | Kagawa |
| 7,912,377 B2 | 3/2011 | Koga |
| 7,940,191 B2 | 5/2011 | Hierzer |
| 8,019,229 B2 | 9/2011 | Fujiwara |
| 8,116,621 B2 | 2/2012 | King |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |
| 8,421,588 B1 | 4/2013 | Ross |
| 8,494,374 B2 | 7/2013 | Snyder |
| 8,538,692 B2 | 9/2013 | Wurman |
| 8,547,036 B2 | 10/2013 | Tran |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,789,191 B2 | 7/2014 | Bhagwat |
| 8,836,922 B1 | 9/2014 | Pennecot |
| 8,886,045 B2 | 11/2014 | Pederson |
| 8,890,773 B1 | 11/2014 | Pederson |
| 8,891,962 B2 | 11/2014 | Du |
| 8,902,076 B2 | 12/2014 | Pederson |
| 8,965,460 B1 | 2/2015 | Rao |
| 9,349,217 B1 | 5/2016 | Worley, III |
| 9,413,469 B2 | 8/2016 | Eden |
| 9,461,748 B2 | 10/2016 | Pederson |
| 9,473,248 B2 | 10/2016 | Yang |
| 9,571,625 B2 | 2/2017 | Kim |
| 9,654,163 B2 | 5/2017 | Pederson |
| 9,964,447 B2 | 5/2018 | Fadell |
| 10,251,243 B2 | 4/2019 | Pederson |
| 10,411,746 B2 | 9/2019 | Pederson |
| 10,763,909 B2 | 9/2020 | Pederson |
| 10,812,186 B2 | 10/2020 | Pederson |
| 2002/0054411 A1 | 5/2002 | Heminger |
| 2002/0060522 A1 | 5/2002 | Stam |
| 2002/0109892 A1 | 8/2002 | Seto |
| 2002/0163448 A1 | 11/2002 | Bachinski |
| 2002/0168958 A1 | 11/2002 | Ford |
| 2002/0181044 A1 | 12/2002 | Kuykendall, Jr. |
| 2003/0025608 A1 | 2/2003 | Pederson |
| 2003/0107748 A1 | 6/2003 | Lee |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1 | 12/2003 | Dowling |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1 | 5/2005 | Berkman |
| 2005/0111700 A1 | 5/2005 | Oboyle |
| 2005/0128751 A1 | 6/2005 | Roberge |
| 2005/0169643 A1 | 8/2005 | Franklin |
| 2005/0231128 A1 | 10/2005 | Franklin |
| 2005/0243173 A1 | 11/2005 | Levine |
| 2005/0252984 A1 | 11/2005 | Ahmed |
| 2006/0012315 A1 | 1/2006 | McDonough |
| 2006/0039698 A1 | 2/2006 | Pautler |
| 2006/0054776 A1 | 3/2006 | Nishimura |
| 2006/0056855 A1 | 3/2006 | Nakagawa |
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0239689 A1 | 10/2006 | Ashdown |
| 2006/0253598 A1 | 11/2006 | Nakamura |
| 2006/0262545 A1 | 11/2006 | Piepgras |
| 2006/0275040 A1 | 12/2006 | Franklin |
| 2007/0041732 A1 | 2/2007 | Oki |
| 2007/0086912 A1 | 4/2007 | Dowling |
| 2007/0098407 A1 | 5/2007 | Hebrank |
| 2007/0104239 A1 | 5/2007 | Koga |
| 2007/0110446 A1 | 5/2007 | Hong |
| 2007/0145915 A1 | 6/2007 | Roberge |
| 2007/0147843 A1 | 6/2007 | Fujiwara |
| 2007/0160373 A1 | 7/2007 | Biegelsen |
| 2007/0165244 A1 | 7/2007 | Yukhin |
| 2007/0195263 A1 | 8/2007 | Shimizu |

(56) References Cited

U.S. PATENT DOCUMENTS

| | | |
|---|---|---|
| 2007/0219645 A1 | 9/2007 | Thomas |
| 2007/0258718 A1 | 11/2007 | Furlong |
| 2007/0269219 A1 | 11/2007 | Teller |
| 2007/0285026 A1 | 12/2007 | Johler |
| 2007/0294029 A1 | 12/2007 | Dandrea |
| 2008/0044188 A1 | 2/2008 | Kagawa |
| 2008/0063404 A1 | 3/2008 | Broyde |
| 2008/0074872 A1 | 3/2008 | Panotopoulos |
| 2008/0128505 A1 | 6/2008 | Challa |
| 2008/0129219 A1 | 6/2008 | Smith |
| 2008/0138077 A1 | 6/2008 | Stretton |
| 2008/0154101 A1 | 6/2008 | Jain |
| 2008/0170536 A1 | 7/2008 | Marshack |
| 2008/0214219 A1 | 9/2008 | Matsushima |
| 2008/0227463 A1 | 9/2008 | Hizume |
| 2008/0292320 A1 | 11/2008 | Pederson |
| 2008/0310850 A1 | 12/2008 | Pederson |
| 2009/0002265 A1 | 1/2009 | Kitaoka |
| 2009/0102396 A1 | 4/2009 | Petrucci |
| 2009/0129782 A1 | 5/2009 | Pederson |
| 2009/0157545 A1 | 6/2009 | Mobley |
| 2009/0226176 A1 | 9/2009 | Franklin |
| 2009/0262760 A1 | 10/2009 | Krupkin |
| 2009/0315481 A1 | 12/2009 | Zhao |
| 2009/0315485 A1 | 12/2009 | Verfuerth |
| 2010/0060194 A1 | 3/2010 | Furry |
| 2010/0111538 A1 | 5/2010 | Arita |
| 2010/0124412 A1 | 5/2010 | King |
| 2010/0142965 A1 | 6/2010 | Breyer |
| 2010/0188846 A1 | 7/2010 | Oda |
| 2010/0209105 A1 | 8/2010 | Shin |
| 2010/0270933 A1 | 10/2010 | Chemel |
| 2011/0006898 A1 | 1/2011 | Kruest |
| 2011/0007938 A1 | 1/2011 | Haynes |
| 2011/0018465 A1 | 1/2011 | Ashdown |
| 2011/0029897 A1 | 2/2011 | Russell |
| 2011/0037712 A1 | 2/2011 | Kim |
| 2011/0063522 A1 | 3/2011 | Karaoguz |
| 2011/0121754 A1 | 5/2011 | Shteynberg |
| 2011/0128384 A1 | 6/2011 | Tiscareno |
| 2011/0140612 A1 | 6/2011 | Mohan |
| 2011/0202151 A1 | 8/2011 | Covaro |
| 2011/0208963 A1 | 8/2011 | Soffer |
| 2011/0225611 A1 | 9/2011 | Shintani |
| 2011/0294465 A1 | 12/2011 | Inselberg |
| 2011/0305460 A1 | 12/2011 | Snyder |
| 2012/0138420 A1 | 6/2012 | Leibu |
| 2012/0179983 A1 | 7/2012 | Lemire |
| 2012/0183301 A1 | 7/2012 | Pederson |
| 2012/0202520 A1 | 8/2012 | George |
| 2012/0230696 A1 | 9/2012 | Pederson |
| 2012/0240196 A1 | 9/2012 | Bhagwat |
| 2012/0251100 A1 | 10/2012 | Rope |
| 2013/0015785 A1 | 1/2013 | Kamada |
| 2013/0094863 A1 | 4/2013 | Pederson |
| 2013/0145610 A1 | 6/2013 | Feri |
| 2013/0201316 A1 | 8/2013 | Binder |
| 2013/0221848 A1 | 8/2013 | Miesak |
| 2013/0229346 A1 | 9/2013 | Jungbauer |
| 2013/0229492 A1 | 9/2013 | Ose |
| 2013/0341062 A1 | 12/2013 | Paquin |
| 2014/0153923 A1 | 6/2014 | Casaccia |
| 2014/0213234 A1 | 7/2014 | Inselberg |
| 2014/0247907 A1 | 9/2014 | McCune |
| 2014/0284390 A1 | 9/2014 | Teng |
| 2014/0286644 A1 | 9/2014 | Oshima |
| 2014/0341588 A1 | 11/2014 | Pederson |
| 2015/0078743 A1 | 3/2015 | Yang |
| 2015/0228419 A1 | 8/2015 | Fadell |
| 2016/0190807 A1 | 6/2016 | Wendt |
| 2017/0367164 A1 | 12/2017 | Engelen |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Kahn et al., "Wireless Infrared Communications," Proceedings of the IEEE, vol. 86, No. 2, Feb. 1997, pp. 265-298.

Jeffrey B. Carruthers, "Wireless Infrared Communications," Wiley Encyclopedia of Telecommunications, 2002.

Akhavan et al., "High-Speed Power-Efficient Indoor Wireless Infrared Communication Using Code Combining—Part I," IEEE Transactions on Communications, vol. 50, No. 7, Jul. 2002, pp. 1098-1109.

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efciency Takes-off at Honolulu International Airport, Spring 2008, pp. 1-13.

(56) References Cited

OTHER PUBLICATIONS

Pacific Northwest International Laboratory: Demonstration Assement of Light-Emitting Diode (LED) Parking Lot Lighting, Phase 1, Jun. 2010, pp. 1-37.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

T. Komine and M. Nakagawa, Integrated System of White LED Visible-Light Communication and Power-Line Communcation Integrated System of White LED Visible-Light Communication and Power-Line Communication, Toshihiko Komine, Student Member, IEEE and Masao Nakagawa, Member, IEEE Date, Feb. 1, 2003 pp. 71-79.

Back et al. "The Virtual Chocolate Factory: Building a Real Wold Mixed-Reality System for Industrial Collaboration and Control". IEEE. (Year: 2010).

Milkawi et al. "A new paradigm for Human-Building Interaction: the use of CFD and Augmented Reality". Automation in Construction. (Year: 2004).

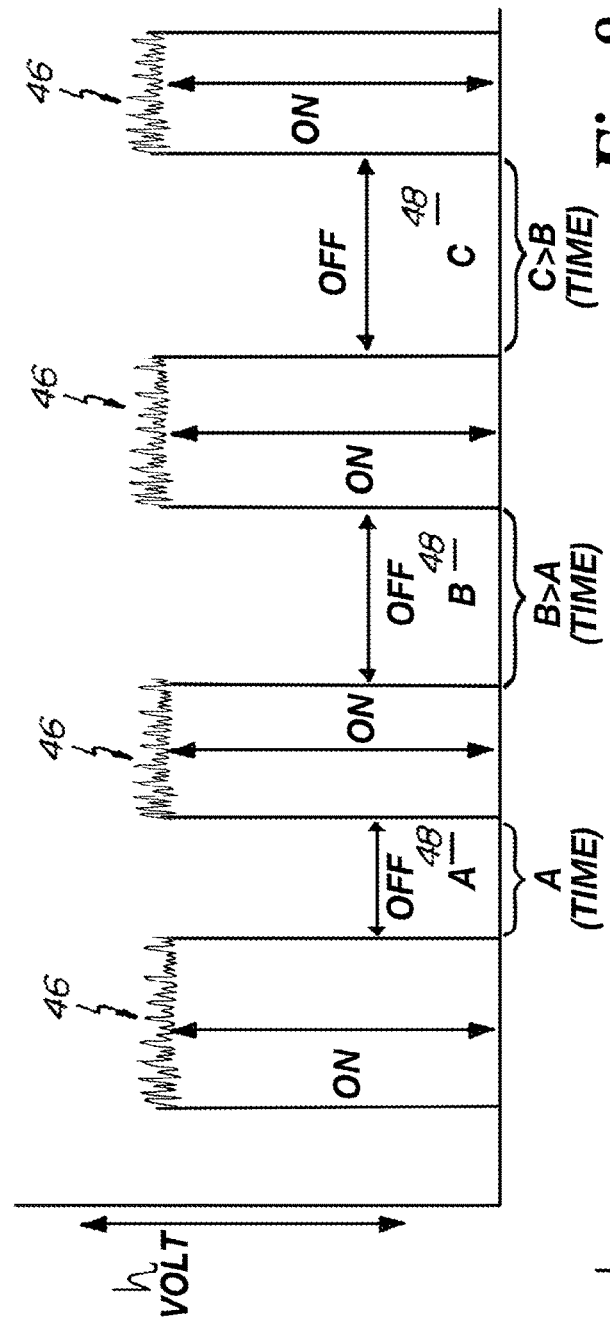
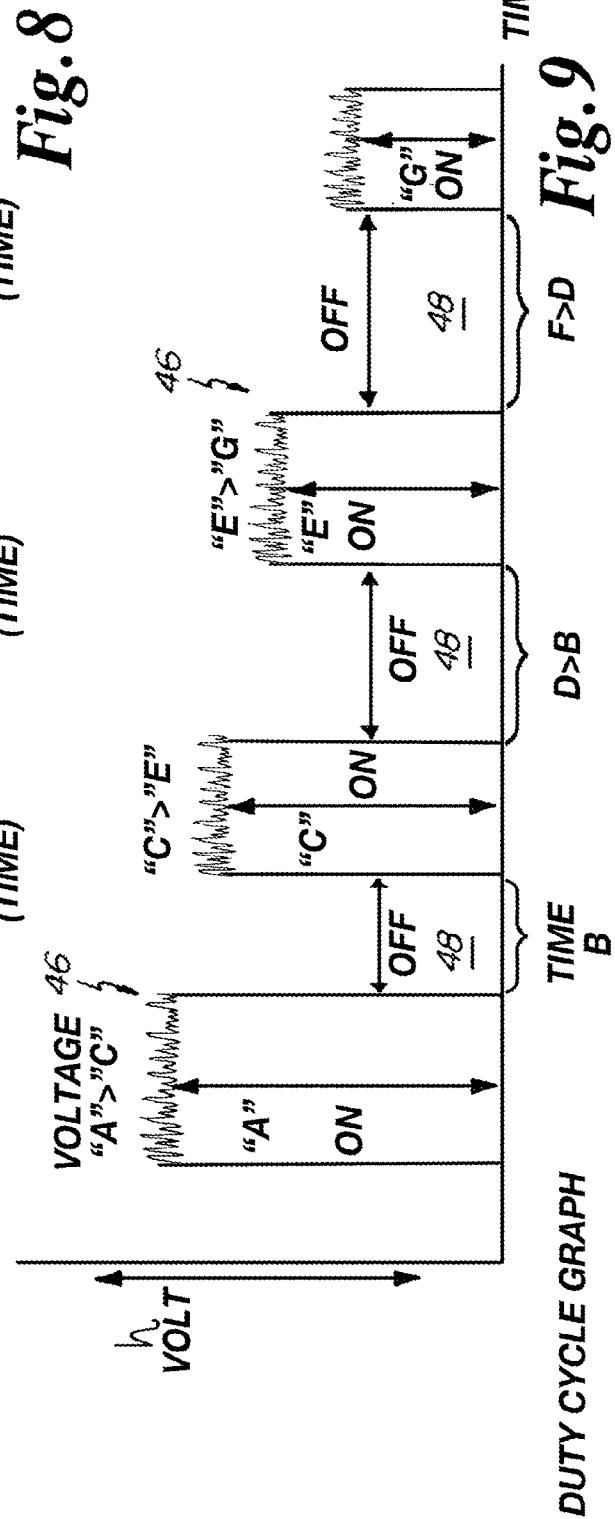

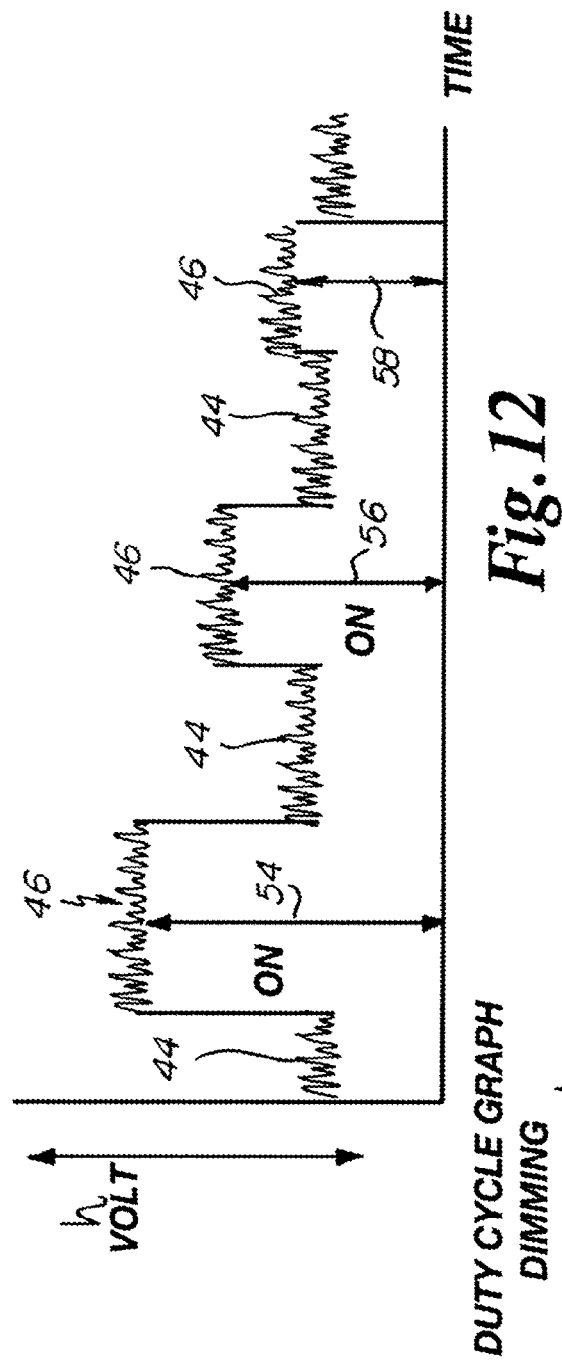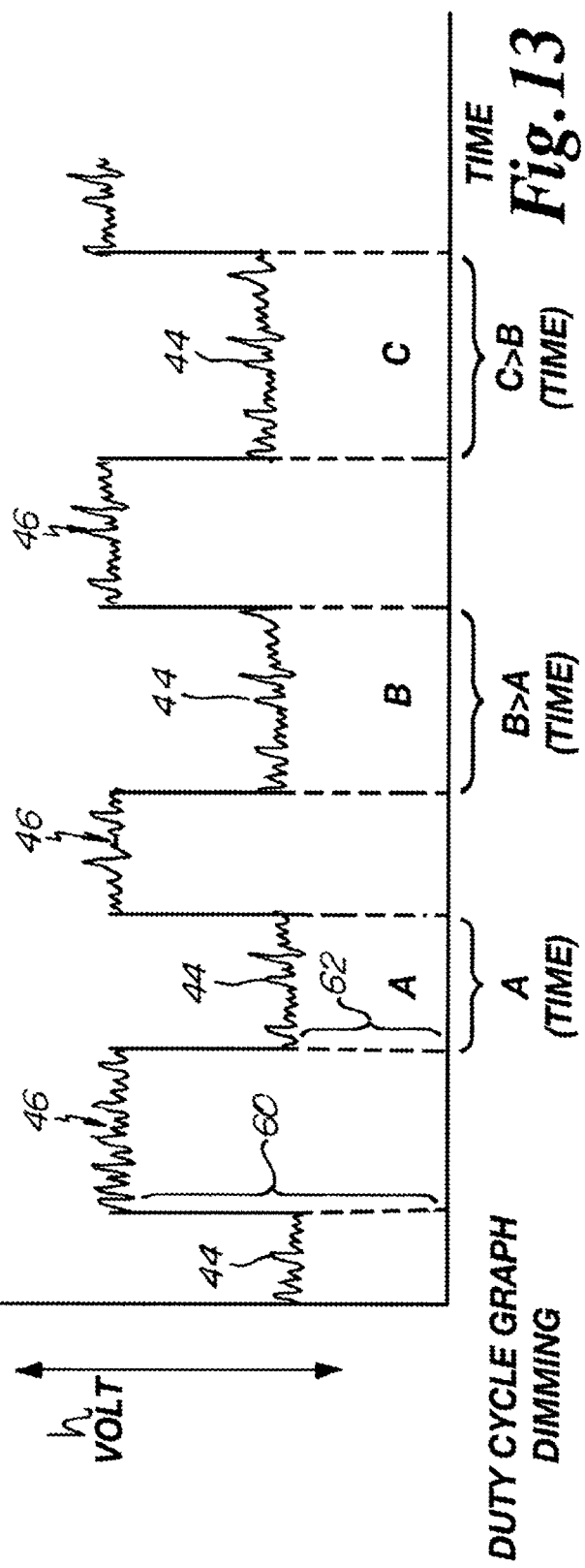

NETWORK SECURITY AND VARIABLE PULSE WAVE FORM WITH CONTINUOUS COMMUNICATION

CROSS-REFERENCE TO RELATED APPLICATIONS

This application is a continuation application from U.S. patent application Ser. No. 17/323,601 filed May 18, 2021, issued as U.S. patent Ser. No. 11/552,712, on Jan. 10, 2023. U.S. patent Ser. No. 11/552,712 is a continuation application from U.S. patent application Ser. No. 16/936,765, filed Jul. 23, 2020, issued as U.S. patent Ser. No. 11/018,774, on May 25, 2021, which is a continuation application from U.S. patent application Ser. No. 16/242,531, filed Jan. 8, 2019, abandoned, which is a continuation application from U.S. patent application Ser. No. 15/042,843, filed Feb. 12, 2016, issued as U.S. Pat. No. 10,205,530, on Feb. 12, 2019, which is a divisional application from U.S. patent application Ser. No. 14/270,670, filed May 6, 2014, issued as U.S. Pat. No. 9,455,783, on Sep. 27, 2016, which claims the benefit of U.S. Provisional Patent Application Ser. No. 61/819,861, which was filed May 6, 2013, all of which being incorporated herein by reference in their entireties.

BACKGROUND OF THE INVENTION

In the past Wi-Fi Internet security within a building has been problematic, especially within public areas. A facility or business has been faced with many difficult choices particularly when accommodating customer or employee convenience and security concerns related to networks, secure information and/or data as stored on servers. Frequently a company or facility has needed to balance individual needs to access a Wi-Fi networks or servers and security to confidential and/or proprietary information. The present invention provides a unique and convenient method to improve security within a facility with respect to a number of types of networks and Internet access within public, semi-private and/or private areas.

In the past, communication and/or data transfer as embedded within pulsed light emitting diode (LED) light transmissions, and reception of pulsed LED light carrier signals has not been optimized when LED lights have been modulated through a power off state during a transmission cycle. The known modulation techniques actuate the LED's between an on transmission status through an off non-transmission status which in turn causes the memory or the memory cache for the information or data transmission to become exhausted or saturated, slowing the communication rate for the transmission of information and/or data embedded within the pulsed LED light carrier signals. The present invention provides a novel modulation system which maximizes the speed of information and data transmission as embedded within pulsed LED light carrier signals, which in turn reduces memory cache exhaustion or saturation.

GENERAL DESCRIPTION OF THE INVENTION

In one embodiment the invention includes a pulsed light communication device having at least one transmission light emitting diode, at least one photo detector, and a plurality of indicator light emitting diodes, the plurality of indicator light emitting diodes emitting at least one of a plurality of wavelengths of colored light;

In one embodiment the invention includes a controller in communication with the at least one transmission light emitting diode, the at least one photo detector, and said plurality of indicator light emitting diodes.

In at least one embodiment, the pulsed light communication device is in communication with at least one network, the at least one network having a network security level, the network security level being identified by at least one of the plurality of wavelengths of colored light.

In at least one embodiment, the controller is constructed and arranged to communicate with the network and to illuminate the indicator light emitting diodes to emit the at least one wavelength of colored light identified for the network security level.

In at least one embodiment a managed switch is in communication with the controller.

In at least one embodiment, the managed switch provides at least two networks where each of the at least two networks has different network security levels, and each of the network security levels are identified by a different wavelength of colored light.

In at least one embodiment, the invention includes an electronic device, where the electronic device is in communication with a pulsed light communication device, the electronic device comprising a controller, at least one transmission light emitting diode, at least one photo detector, a network interface and a plurality of indicator light emitting diodes, the plurality of indicator light emitting diodes comprising light emitting diodes emitting at least one of a plurality of wavelengths of colored light, the controller being in communication with the at least one transmission light emitting diode, the at least one photo detector, and said plurality of indicator light emitting diodes, where the electronic device is in communication with at least one network, the at least one network having a network security level, the network security level being identified by at least one of the plurality of wavelengths of colored light, and where the controller is constructed and arranged to communicate with the network to illuminate the indicator light emitting diodes to emit said at least one wavelength of colored light identified for the network security level.

In at least one embodiment, the invention includes at least one second transmission light emitting diode, at least one second photo detector, and a plurality of second indicator light emitting diodes, the plurality of second indicator light emitting diodes emitting at least one of a plurality of wavelengths of colored light, and a second controller in communication with the at least one second transmission light emitting diodes, the at least one second photo detector, and the plurality of second indicator light emitting diodes wherein the pulsed light communication device is in communication with the at least one network, the second controller is constructed and arranged to communicate with the network and to illuminate the second indicator light emitting diodes to emit the at least one wavelength of colored light identified for the network security level.

In at least one embodiment, the invention includes at least one transmission light emitting diode, at least one photo detector, and a controller in communication with the at least one transmission light emitting diode and the at least one photo detector, the controller generating a continuous uninterrupted modulated pulsed light emitting diode light signal transmitting information or data, the continuous uninterrupted modulated pulsed light emitting diode light signal having a sensitivity threshold detection level, where the continuous uninterrupted modulated pulsed light emitting diode light signal has an amplitude equal to or above the sensitivity threshold detection level.

In at least one embodiment, the information or data comprises an origination identifier and the origination identifier comprises global positioning system information. In at least one embodiment, the information or data comprises a destination identifier, and the destination identifier comprises global positioning system information.

In at least one embodiment, the invention includes global positioning system routing system information.

In at least one embodiment, the continuous uninterrupted modulated pulsed light emitting diode light signal has constant amplitude, variable amplitude, constant frequency, variable frequency and/or any combination thereof.

BRIEF DESCRIPTION OF THE DRAWINGS

FIG. 8 is an alternative duty cycle graph.

FIG. 9 is an alternative duty cycle graph.

FIG. 12 is a duty cycle graph of one alternative embodiment of the invention.

FIG. 13 is a duty cycle graph of one alternative embodiment of the invention.

DETAILED DESCRIPTION OF THE PREFERRED EMBODIMENTS

In some alternative embodiments the invention is directed to the improvement of Internet network security within a facility. The invention identifies and displays a type or level of Internet or network access by an individual electronic device 30 within a public or private area. In some alternative embodiments, the invention is directed to a modulation system for carrier signals of embedded pulsed LED light communication of information and/or data, where the modulation system reduces memory or memory cache exhaustion or saturation during transmission of the pulsed LED light communication carrier signals.

In one alternative embodiment, an individual, a business, or a facility may provide the public or employees within a public space, semi-private space, or private space Internet access, or access to one or more networks. In situations where the individual, business, or facility is concerned about security, the individual, business, or facility may elect to simultaneously provide one or more alternative networks having different levels of security for designated areas within a facility. The alternative networks provided by the individual, business, or facility may utilize optical transceivers for receipt and transmission of visible light or illumination comprising embedded pulsed LED communication signals used for transmission of information or data.

In some embodiments an individual, business, or facility providing Internet access or access to a network at a facility may provide any desired number of Internet or other networks, one of which may be identified as a blue network, which is a network utilizing optical transceivers and visible LED light communication signals. The blue network may represent designated public access to a network or Internet and the lowest level of security for an individual within a particular designated space. In this embodiment an individual may walk into a public area and access the Internet or network in a manner similar to an individual accessing the Internet using a laptop computer, a cellular telephone, a tablet computing device or other electronic communication device. The individual may access the Internet through the use of the pulsed LED light or visible LED light communication signals including embedded information or data via an LED light link key, or an LED dongle device 10 which may be coupled to, or built into, the electronic communication device, computer, cellular telephone, tablet, handheld or portable communication device, or any other electronic device capable of transmission and/or receipt of pulsed LED light or visible light communication signals. In alternative embodiments an LED light link key or dongle device 10 may be releasably connected to the electronic communication device 30 for communication of information or data through embedded pulsed LED light transmissions or communication signals between the electronic device 30 and an LED light fixture 12 including a controller/server 40.

Figures 1, 2, 3:
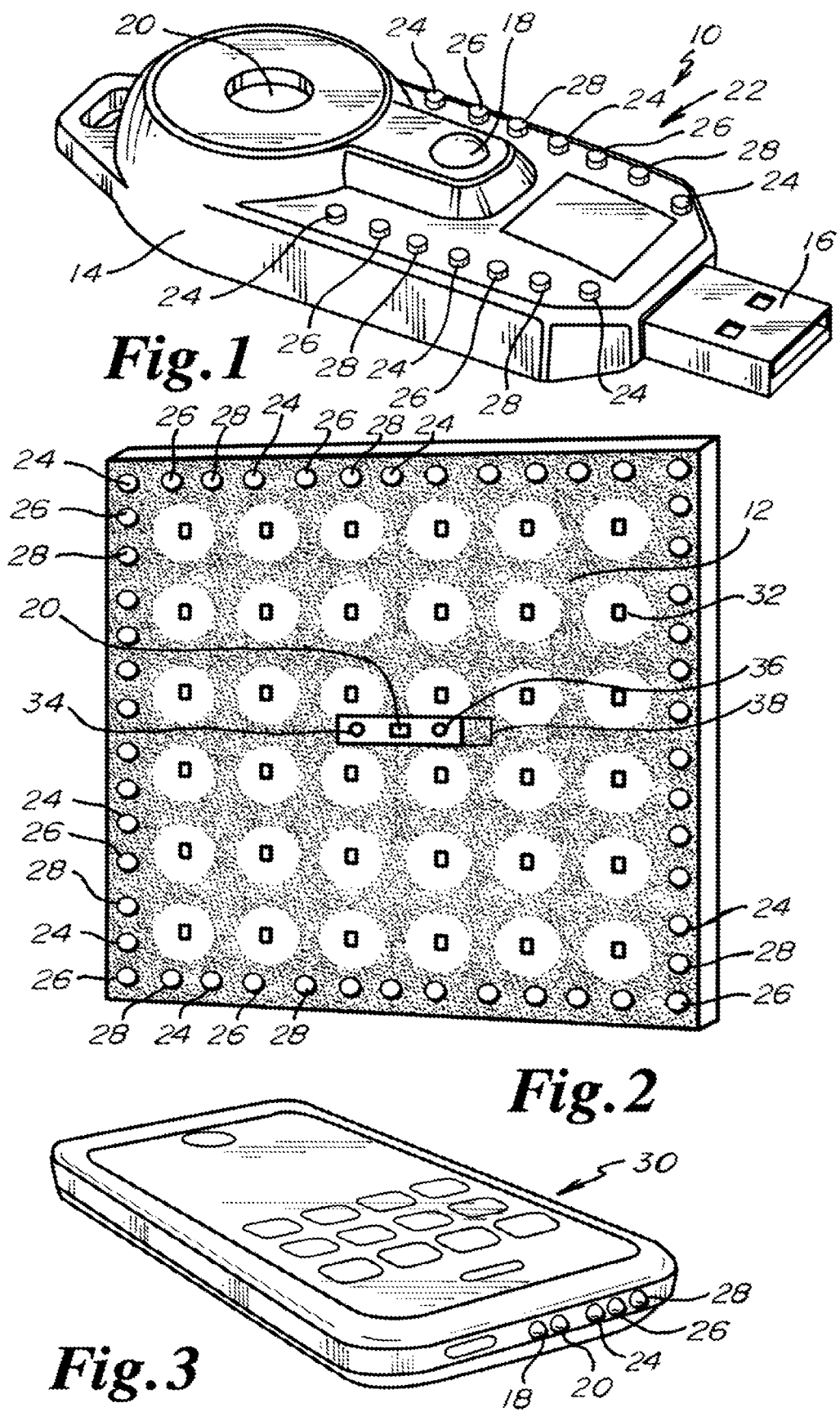
FIG. 1 is an isometric view of one alternative embodiment of a dongle or LED light link key used in the practice of the invention.
FIG. 2 is a bottom or face view of one alternative embodiment of an LED light fixture used in the practice of the invention.
FIG. 3 is an isometric view of one alternative embodiment of an electronic device used in the practice of the invention.
Figure 4:
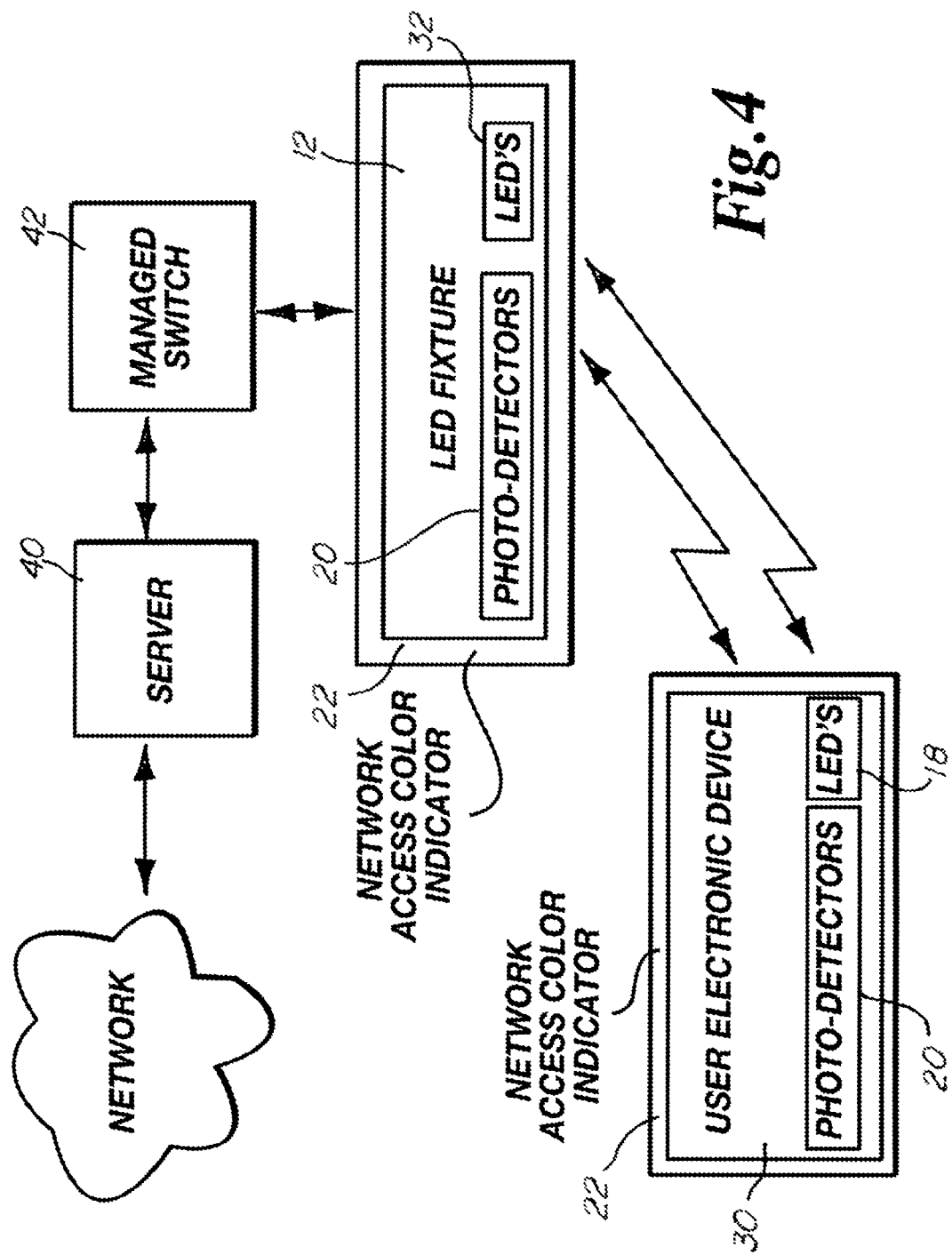
FIG. 4 is a system diagram of one alternative embodiment of the invention.

In at least one alternative embodiment as depicted in FIG. 1 an LED light link key or dongle device 10 is shown. The LED light link key 10 in some embodiments includes a housing 14, a USB or other electronic device interface 16, at least one transmission LED 18, and at least one photo diode 20. In at least one embodiment, the LED light link key 10 includes a circuit board having a microchip controller or processor (not shown). In some embodiments, a plurality of indicator LED's 22 are disposed on the exterior surface of the housing 14. The indicator LED's 22 are in electrical communication with the microcontroller or, processor of the LED light link key 10. The microcontroller or processor of the LED light link key 10 is also in electrical communication with the at least one transmission LED 18 and at least one photo diode 20.

In some embodiments, the indicator LED's 22 are formed of LED's generating different wavelengths of visible light such as blue LED's 24, green LED's 26, and red LED's 28.

In some embodiments, the microcontroller for the LED light link key 10 will identify, or receive a transmission for the identification of, a location for an LED light fixture 12 and the general proximity of an electronic device 30 within a designated area.

In at least one embodiment, LED light fixture 12 is assigned a location identifier which in some embodiments may include global positioning system information (GPS information). In addition, in at least one embodiment, LED light fixture 12 will include software to assist in routing of communications, data, or information as a portion of a global positioning system routing system (GPSRS) to a destination identifier from an origination identifier as integrated into LED light fixtures 12 where a plurality of fixtures 12 from a communication network. In some embodiments, an electronic device 30 or an LED light link key 10 will include a device identifier which will be embedded in communications or information transfer to an LED light fixture 12. An LED light fixture 12 receiving an embedded LED signal from a LED light link key 10, or electronic device 30, will be able to identify the location of the LED light link key 10 or electronic device 30 as being proximate to the LED light fixture 12, which includes a unique identifier and assigned GPS and other location information and GPSRS routing system information. In at least one embodiment the identification of the location of an LED light link key 10, or electronic device 30, may be dynamic and based on recognition of the relative location of the LED light link key 10, or electronic device 30, relative to a unique LED light fixture 12 having an assigned location identifier. In some embodiments, the unique location identifier for the LED light fixture 12 is stored in controller or server 40.

In some embodiments, the microcontroller for the LED light link key 10 will also recognize the level of security for the network being accessed by the electronic device 30 within the designated area where the microcontroller will illuminate a select color of indicator LED's 22, which will be visible to an individual within the vicinity of the electronic device 30. For example, if the security area for a particular space is designated as having a blue security clearance level, and the electronic device 30 is accessing the blue network, then the microcontroller on the LED light link key 10 will illuminate the blue LED's 24 on the exterior of the housing 14 to generate an observable blue light for the electronic device 30. The blue light will be observable to the individual and others within the vicinity of the electronic device 30.

In some embodiments as depicted in FIG. 2 an LED light fixture 12 is shown. The LED light fixture 12 may include a plurality of LED's 32, at least one photo diode 20, at least one camera 34, and at least one microphone 36 and/or speaker 38. The LED's 32, camera 34, microphone 36, and/or speaker 38 are in communication with a fixture controller/server 40 and power unit disposed on the opposite side of the LED light fixture 12. The LED's 32 generate illumination as well as pulsed LED light carrier signals embedded with information, communications, or data to be transmitted over a pulsed LED light information carrier network.

In at least one alternative embodiment, the LED light fixture 12 includes a plurality of indicator LED's 22 comprising LED's generating blue light 24, green light 26, and/or red light 28 to name a few. As depicted in FIG. 2, the indicator LED's 22 are disposed proximate to the exterior circumference of the LED light fixture 12. In alternative embodiments, the indicator LED's 22 may be disposed at any location or in any configuration on the face of the LED light fixture 12.

In some alternative embodiments, the indicator LED's 22 of the LED light fixture 12 are in communication with an LED fixture controller/server 40 in order to generate a particular color of observable light representative of a security level for a designated area. For example, a lunchroom or reception area may be designated as a blue network security area where the controller 40 for the LED light fixture 12 will illuminate the blue LED's 24 displaying a blue light circumference for the LED light fixture 12. Individuals may then know the level of security access and networks authorized within a designated security area within a facility by observation of the emitted color of the LED light from the circumference of the LED light fixture 12.

In some embodiments, unauthorized access to an alternative network having a designated higher security clearance may cause the LED light fixture 12 to change the color of the indicator LED's 22 and may cause the indicator LED's 22 to flash to visually identify that an unauthorized network access has been attempted or obtained within a particular designated area. Individuals may then attempt to identify the unauthorized access to the network or the security level for the attempted unauthorized network access, whereupon the authorized network and/or the network having the higher security level may be either manually or automatically terminated for a designated area or areas by a trigger or other threshold device or event, including a timing cycle or countdown. Corresponding to a timing event the intervals between flashes of the indicator LED's 22 in one embodiment may decrease as network severance becomes more imminent. In some embodiments the rate of flashing of the indicator LED's 22 will increase until severance to network access occurs.

In at least one embodiment, if unauthorized access to a restricted secure network is attempted from a low security zone, an investigation signal will be transmitted by the server 40 of LED light fixture 12 to a facility security station where a security breach investigation may be immediately initiated. In at least one embodiment, if unauthorized access to a restricted secure network is attempted from a low security zone, a recording may be triggered activating camera 34, and/or microphone 36 which are in communication with server/controller 40 of LED light fixture 12, to record images and sound within the low security zone to identify an individual attempting to obtain unauthorized access to a secure network. The identification of the attempted unauthorized access may be facilitated by the change in color of the indicator LED's 22.

In at least one embodiment, an electronic device 30 is broadly defined to include laptop computers, cellular telephones, tablet computing devices and/or other electronic devices which are capable of, or may be modified to, communicate with a network or Internet through the use of pulsed LED light carrier signals including embedded information or data communications or transmissions. In some embodiments, the electronic device 30 may include a USB or other port which is constructed and arranged to receive a connecting USB or other interface 16 of an LED light link key 10.

In alternative embodiments, the electronic device 30 may include built-in elements of at least one photodetector 20, at least one transmission LED 18, at least one camera, at least one microphone, at least one speaker, and/or a plurality of indicator LEDs's 22. The indicator LEDs's 22 as built into the electronic device 30 will also be formed of the blue LED's 24, green LED's 26, and red LED's 28. In some embodiments, the controller for the electronic device 30 is in communication with the indicator LED's 22 which display a color representative of the security level for the network or Internet which is being accessed by an individual within a designated area of a facility. In some embodiments, the elements of the at least one photodetector 20, the at least one transmission LED 18, and/or the indicator LED's 22, may be disposed at any desired location on an electronic device 30 or alternatively may be Incorporated into the electronic device 30 at any desired location.

In one alternative embodiment, for example an individual may be present in a lunchroom at NASA or other public or private gathering area where the individual is accessing the Internet over a network using an optical transceiver and visible LED light communication signals through the use of an electronic device 30. In this example the optical light transceiver of fixture 12 will include a light sensor or photodiode 20 which may include indicator LED's 22 around the fixture 12 which may illuminate different colors dependent upon the network being accessed by an individual. If a network having a first level of security is designated as the blue network then the indicator LED's 22 around the fixture 12 may be blue and be observed by individuals located in the NASA lunchroom. The Internet signal from the electronic device 30 used by the individual will generate a signal, code, or communication which is received by the photo diodes 20 of the optical transceiver of the fixture 12, where the signal, code, or communication will be recognized as having a designated level of security, in turn causing the indicator LED's 22 on the fixture 12 to emit a visible color representative of the Internet or network being used by the individual electronic device 30, and the level of security access for the designated area. In one embodiment, if an area is designated as a general or public security area, and the blue indicator color is selected for the Internet or network and security level in the designated area, then an individual in this designated area accessing the Internet or network will cause the indicator LED's 22 on the electronic device 30 and the LED light fixture 12 to emit a blue light.

In some embodiments, an LED light fixture 12 may include a plurality of rows, columns, or rings of indicator LED's 22 where each row, column, or ring may be assigned to communicate different colors representative of security levels. For example one ring may represent the security level for a designated area and a secured ring may represent the network accessed by an electronic device.

In some alternative embodiments, a second or additional network having a higher security level may be designated by the indicator LED's 22 illuminating light having the color red. An individual located in a public area, such as the lunchroom example as identified above, where the network security is designated for the color blue, attempting to access a red or more secure network, will cause some or all of the indicator LED's 22 on the electronic device 30 and/or the transceiver/fixture 12 to emit a red light, which in turn will provide to individuals and security personnel at least a visual signal that someone is attempting to access a higher security network in an area designated for low security access, signaling investigation to an unauthorized network access based upon the selected security area.

In an alternative embodiment having a designated area such as a lunchroom as identified above, the software integral to the electronic device 30 may cause the microcontroller of the electronic device 30 to generate a signal which is transmitted by embedded pulsed LED light from the transmission LED 18 for receipt by the photodiode/photodetector 20 of the transceiver/light fixture 12. The signal from the electronic device 30 represents the security level for the network/Internet which is being accessed by the electronic device 30. A network security level identification signal may be periodically transmitted over the network or Internet which is received by the photodetector 20 on the electronic device 30 and is re-transmitted upstream to the photodiode/photodetector 20 of the transceiver/light fixture 12. In some embodiments, the electronic device 30 receives a network security level identification signal which is processed by the microcontroller for the electronic device 30, which illuminates the appropriate indicator LED's 22 on the electronic device 30. In some embodiments, the electronic device 30 both receives and transmits the received network security level identification signal, and illuminates the appropriate color of indicator LED's 22 on both the electronic device 30 and the transceiver/fixture 12.

In some embodiments areas for a facility may be designated for a lower security level such as a guest or a visitor and other areas may be designated for an intermediate security level identified by a green indicator light and higher security areas may be designated by the color red. It should be noted that more or fewer security levels for Internet access or networks may be assigned where each level is assigned a corresponding color for the indicator LED's 22. In some embodiments, the modulation or intensity of one or more of the indicator LED's 22 may be generated simultaneously to provide any desired color combination derivative from output of a combination of red, green, and blue wavelengths of visible light.

In one alternative embodiment, the indicator LED's 22 may be arranged in a ring which may emit observable light of different colors. In an alternative embodiment, if an individual entered into a NASA conference room or lunchroom and attempted to access a network having a security clearance which was not authorized for the designated area, which might be a network having top secret security clearance, (red network) then individuals present in the conference room/lunchroom designated as a network for a guest or a visitor (blue network) would be able to observe an incorrect color indicator representing attempted access to a high security network.

In some embodiments the recognition of the appropriate network security and the control of the indicator LED's 22 may be accomplished through the use of software, hardware or a combination of software and hardware which may be integral to an optical transceiver for an electronic device 30 or LED light fixture 12 or both. In some embodiments without the use of the indicator LED's 22, if an individual were to access an authorized network within a designated area and then attempt to access to an unauthorized more secure network, identification of the unauthorized access would be difficult.

In some embodiments in order to accomplish the provision of separate networks having different security levels to designated areas, a managed switch 42 may be utilized either upstream or downstream from the server 40 and optical transceiver of the light fixture 12, so the pulsed LED light communication signals then become the communication link. In this embodiment, an area would not utilize different jacks for every different available network. In some embodiments, the use of optical transceivers and the use of one or more managed switches 40 are used to enhance flexibility and functionality for a facility where only one device may be required to be provided in order to access multiple different networks having alternative security clearances. In at least one embodiment the managed switches 42 are capable of software switching to different networks, which in turn provides access to different levels of security.

Managed switches 42 may vary in speed and the flexibility for the isolation of signals between networks to prevent transition from one network to another, thereby violating security protocols.

In at least one embodiment the pulsed LED light carrier signals as generated from an optical transceiver may be used as a portal for access to a managed switch 42, which in turn provides access to a designated network having a set security clearance.

In at least one embodiment, access to different networks having different security authorizations may occur through the use of identifiers such as a Mac code for the electronic device 30. In other embodiments an LED light link key 10 may include an identifier such as a Mac code establishing a security authorization for a particular electronic device 30 which is interfaced with LED light link key 10. In some embodiments the LED light link key 10 may be plugged into a computer or other electronic communication device 30, where the designated client access LED light link key 10 lights up the indicator LED's 22 and provides a pulsed LED light communication signal through a pulsed LED light communication network. In at least one embodiment the designated client access LED light link key 10 may include a unique Mac or other code which may be recognized by the managed switch 42 and infrastructure behind the managed switch 42, to determine whether or not an individual is authorized to communicate with one or more networks or networks having different security authorization parameters.

In at least one embodiment, at least one transceiver/LED fixture 12 may provide varied pulses which may be identified as sync pulses, or synchronization pulses, which retain data so that a processor integral to or separated from an optical transceiver for the LED light fixture 12 may recognize and discern the data and/or the sync pulses to provide pulsed LED light communication and/or transmission of information or data.

In at least one embodiment the utilization of synchronization pulses, which may include data, may be readily recognized by the managed switch 42 and/or processor 40 integral to, or removed from, an optical transceiver for the fixture 12 to either permit or restrict access to a particular network functioning in a manner similar to a master key system for a building. In some embodiments certain keys may provide access or authorization to certain networks or doors and other keys may only open a single network or door. In at least one embodiment access into a network may be regulated by a managed switch 42, synchronization pulses and/or through the use of hardware.

The designated client access device or LED light link key 10 may include any type of identification or authorization code similar to a PC or Mac address which would function as a device identifier and network access signal identifier. The identification or authorization code of the LED light link key 10 used during optical communications would be unique, so that access and/or a transmission based upon an identification or authorization code for a network having a higher security would be gibberish and unrecognizable for a lower security network, including a managed switch 42. In at least one alternative embodiment access into different network environments may be regulated by a hardware key as compared to an identification or authorization code or sync pulses of software used in an LED light fixture 12 or an electronic device 30. In at least one alternative embodiment, access into different network environments would be regulated by a combination of software as incorporated into an electronic device 30, LED light fixture 12, managed switch 42, and/or a hardware key in any combination. In at least one embodiment it would not be possible to access a restricted network with an incorrect pulse identification, which would physically prevent access to a restricted network. In at least one embodiment for the master key for a network, one or more branches or sub keys for sub networks may be available such as key "A" network which may have branches such as "AA", "AB", "AC", "AD", "AE", representative of sub-networks, and underneath the sub-branches additional sub-branches may be available, so one pulse may provide authorization and/or access into one network or area, and another modulation of the pulse, the timing of the pulse, or sync of the pulse may provide authorization and/or access to other networks.

Figure 5:
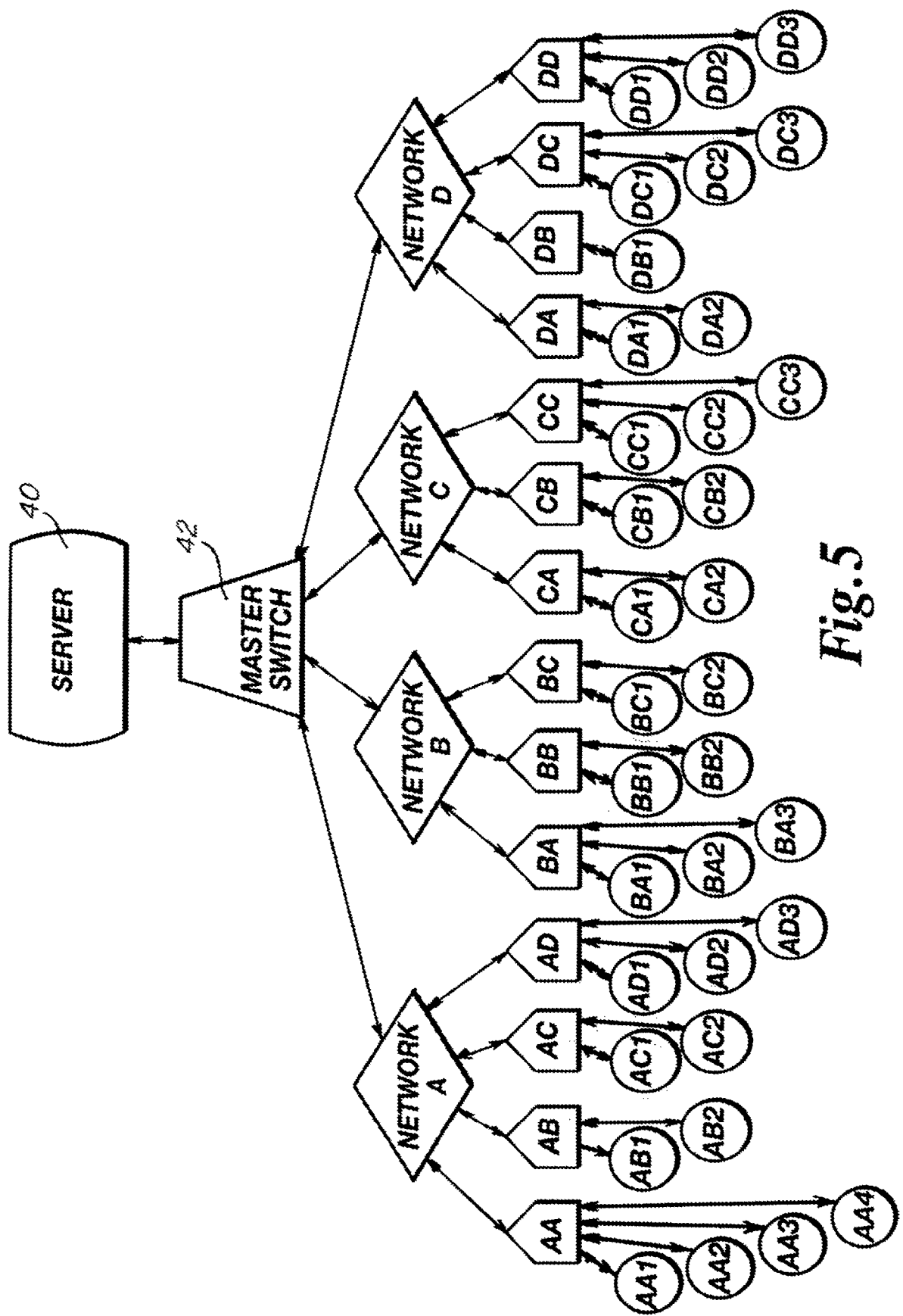
FIG. 5 is a block diagram of one alternative embodiment for the operation of the switch used in the practice of the invention.

In at least one embodiment, as depicted in FIG. 5, a plurality of networks "A", "B", "C", and "D" are identified.

In some embodiments, any number of networks may be used. In some embodiments each network may be assigned a limited range of wavelengths of light in the visible spectrum. For example, light in the visible spectrum normally occurs between wavelengths of light of approximately 380 nm violent to 740 nm red. In some embodiments, a network, for example network "A", may be restricted to wavelengths of light between 380 nm and 430 nm. In some embodiments, the LED light link key 10 may include software or hardware to recognize, receive, and/or emit wavelengths of light only between 380 nm and 430 nm. In some embodiments, network "A" may include sub-networks "AA", "AB", "AC", and "AD". In some embodiments, sub-network "AA" may include software or hardware to recognize wavelengths of light between 420 nm and 430 nm. In some embodiments, the managed switch 42 and/or the server 40 for the transceiver of the LED light fixture 12 may only transmit sync pulses to a particular identified electronic device identifier which has assigned software and a Mac address for receipt of wavelengths of light between 420 nm and 430 nm. In the controller 40 for the LED light fixture 12 and/or the managed switch 42, the wavelength of light between 420 nm and 430 nm may be assigned as a low security network and assigned the blue LED's 24 for the indicator LED's 22 for display on the electronic device 30 and/or LED light fixture 12.

In alternative embodiments, the sub-network "AA" may include additional sub-networks such as "AA1" which include software and/or hardware to recognize wavelengths of light between 428 nm and 430 nm. In this manner, sync pulses and assignment of wavelengths of visible light may be used to establish any desired number of networks. Each network may also be assigned a different security level. In some embodiments, the managed switch 42 and the controller 40 of the LED light fixture 12 receive and recognize the identifier for an LED light link key 10, or internal identifier from an electronic device 30, to recognize an authorized network based on approved security within a designated facility location. In addition, the authorized network in conjunction with the indicator LED's 22 transmit a color to verify authorization to the appropriate network in the approved designated area. Deviation from the authorized network, and/or authorized designated area in some embodiments will display a visual signal indicating unauthorized access and may result in network deactivation.

In some embodiments, the use of software and hardware or combinations of software and hardware within the devices of the managed switch 42, LED light link key 10, electronic device 30, and/or server 40 for the optical transceiver for the LED light fixture 12 may establish any number of networks with any desired security level within any designated area of a facility. Further, the use of the indicator LED's 22 improves network security authorization reducing risk of a security breach.

In some embodiments, more than a single network, sub-network or sub-sub-network may be assigned the same security clearance and color indicator from LED's 22. In some embodiments the use of a number of networks arranged in a tree or hierarchy reduces network saturation improving pulsed LED light communications and/or information or data transfer. In some embodiments, a plurality of wavelengths of visible light are emitted simultaneously from one or more LED's to accomplish improved LED pulsed light embedded communications.

In at least one embodiment, a variation of an eight conductor cable, category six cable, may provide two or more channels which may vary the voltage to the LED's 32 of the LED light fixture 12 affecting the pulsed light output to accomplish embedded pulsed LED light communication. Embedded pulsed LED light communication is an effective way of managing the intensity levels for the pulsed light output during communications/transmissions while simultaneously providing 100% communication/transmission capability.

In at least one embodiment, independent variable features may be incorporated into the managed switch 42 for access to independent networks, which may also include variable capability of the timing pulses and/or sync pulses. Variations utilized in association with the timing pulses and/or sync pulses may include, but are not necessarily limited to, operations which function is a manner similar to AM or FM modulation communication schemes. In some embodiments the timing pulses and/or sync pulses may be or may include digital encryption methods or techniques. It should be noted that the types of variations to be utilized in association with the timing pulses and/or sync pulses is not restricted to the types identified herein and may include other types or variations to accomplish the desired data or other communication transfer occurring through pulsed LED light communications as embedded within illumination provided to a user.

In at least one embodiment the above features accomplish network differentiation, or security access differentiation, for an individual using a network. In at least one embodiment, an individual obtains access to a network by passing a first hardware door, then the individual may obtain access to the managed switch 42 and/or the software doors prior to connection to a desired network having assigned security clearance levels.

In at least one embodiment, as the proficiency of the network switch, acting as a managed switch 42 is improved, the security between different networks is enhanced. In at least one embodiment a hardware door is provided in addition to a software door prior to access to a desired network thereby improving the overall security for network usage.

One problem associated with embedded pulsed light communication is related to the reduced intensity of the LED's during a known duty cycle passing through zero which interferes with the communication signal. The present invention in at least one embodiment, provides pulsed LED light embedded communication without interfering with the communication signal, by varying the duty cycle of the pulse wave form, deviating from the duty cycle traditionally provided to the LED's used for illumination and/or signal transmission.

In the past, the duty cycle exposed to LED's during transmission of information/data did not permit constant and continuous communication. In the past, the variation of the known duty cycle passes through zero causing complications and slowing down the pulsed light communications, and in certain instances actually resulted in stoppage of the communication. In the past the use of a standard duty cycle for the LED's during operation for transmission of embedded pulsed light communication signals has resulted in interrupted communication, reducing the value and efficiency of pulsed LED light communications.

Figure 6:
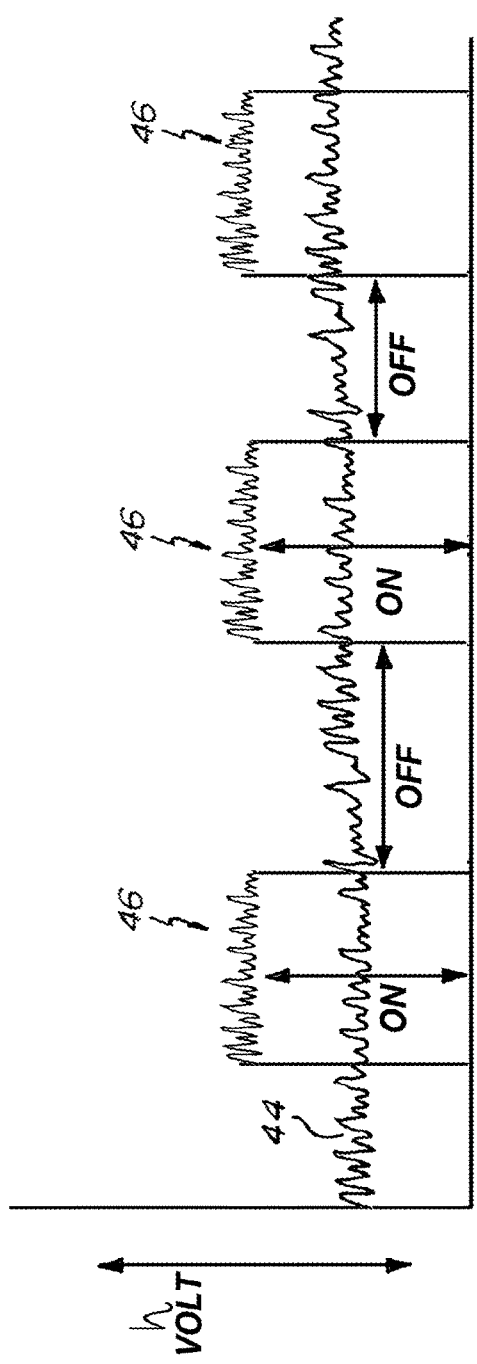
FIG. 6 is a duty cycle graph of one alternative embodiment of the invention.

Interrupted pulsed LED light embedded communication or transmissions have occurred because a typical duty cycle for the LED's passes through a zero or off state as depicted in FIG. 6. The passing of the duty cycle through zero or off state in turn interrupts/terminates embedded pulsed light transmissions/communications when the LED duty cycle is off or at zero. The communication/transmissions from the server 40 or controller on an electronic device 30 are not interrupted or terminated where transmission/communications are continuously sent to, or stored in memory for a device having embedded pulsed light transmission communication capabilities. In these instances, the memory or memory cache capacity for the device may become exhausted and/or memory bandwidth saturation may occur, which in turn slows down the transmission/communication of information or data transmission through the use of the embedded pulsed LED light communications.

In at least one embodiment, the invention varies the voltage provided to the LED's using injector circuits having variable voltage control circuits and/or a variable power supplies or miniature variable power supplies. In at least one embodiment, the use of variable injector circuits having variable voltage control and/or power supply (which may be miniature) maintains the efficiencies and running the LED's to improve the performance, quality, and operation of embedded pulsed LED light communication signals. In at least one embodiment, the variable voltage as provided to the LED's maximizes the efficiencies and transmission of embedded pulsed LED light communications while simultaneously providing a desired output of illumination. In at least one embodiment the use of variable voltage as provided to the LED's provides or enables the embedded communication pulses to have total exclusivity to any variation in pulses. At least one embodiment, power may be provided over the Ethernet.

In some embodiments, the voltage provided to an LED light fixture 12 originally may be fixed which may be replaced with variable voltage. Variable voltage aids in communication and adds to the efficiency and the intensity of the light, and permits variation on two or more channels over an ethernet, so that control of the color may be provided, thereby reducing the more yellow light warm and increasing the more white cool light provided by an LED light fixture 12. In some embodiments, warm light may also be referred to as hot, and cool light may be referred to as cold. In certain embodiments it is desirable to reduce the hot light and the cold light or both. In some embodiments, it is desirable to not terminate or to turn the duty cycle for the LED's off, so that a pulsed LED light generated communication signal may continue, and may be sufficiently strong so that the signal may continue to communicate or transmit information or data. In the past the known duty cycle for LED's terminating power at regular intervals, increased the difficulty to maintain continuous communications, while simultaneously providing a perceived reduction in light emission or illumination. The provision of reduced and/or terminated pulsed LED light duty cycles increased the difficulty to communicate and/or slowed down the pulsed LED light communications.

In some embodiments, a duty cycle operates by providing within a standard communication a data pulse train driving the current into the LED's. The light output from the LED's is modulated based on that data pulse train provided to the LED's. In some embodiments, in order to dim the lights, another train of pulses is embedded into the original data pulse train so that a blanking out of the whole system occurs, to shut the LED lights off completely at regular intervals. When the LED lights are on at regular intervals, then data continues to be emitted from the LED lights, however, when the LED lights are completely off at regular intervals, then no data is being transmitted through the standard dimming approach. In some embodiments this also equally applies to color changing to provide dim to cool light or dim to warm light, and the desired variation in color would occur along with the desired level of dimming of the lights.

In at least one embodiment, instead of embedding an on/off blanking signal over an original signal, in order to dim the LED lights, the LED lights are on at all times so the data is moving at all times. In order to transmit pulsed LED light communication signals as embedded within illumination or light, in one embodiment, a lower total voltage or current is output as compared to the average current or voltage output being provided to the LED's. By lowering the voltage and providing a continuous light emission or illumination, a continuous stream of data pulse trains is available. In some embodiments, the use of a modified duty cycle in replacement of an off cycle does not sacrifice what could be 50% of the communication capability of a traditional pulse train. In some embodiments, the use of a modified duty cycle eliminating and off cycle does not sacrifice band width for the embedded pulsed LED light transmissions/communication. This embodiment does not sacrifice band width because the turning on and off of a transmission of embedded data communication is removed, where the pulsed LED light is not modulated in and on/off manner.

In at least one embodiment during a period of time where the current is applied to the LED diodes to provide illumination, variations are provided in the current to create a data pulse stream. In the past the current is either on or off providing a data pulse stream and a duty cycle which is on or off giving the perception to the human eye that the light is less intense, because it is turning on and off very rapidly, and an individual's eye starts to observe less photons and perceives that the light is dimming. During the duty cycle when the current is off and the pulse width is at zero, there is no light, and it is dimming the total illumination observed, which simultaneously prevents data communications during the periods of time when the current is zero, which in turn prevents/reduces the available time for transmission of communication data further lowering band width.

When current is returned to the LED's and illumination resumes, the human eye starts perceiving illumination and simultaneous transmission of data resumes which is embedded in the illumination. The duty cycle as known is in a repetitive sequence of on/off, on/off, repeating.

In the traditional duty cycle for LED embedded signals, data may only be transmitted within illumination pulses when current is being provided to the LED's. There is no light between pulses, so there is no ability to carry data when the light carrier is off, which reduces the ability to carry data.

In at least one embodiment the voltage is varied, however, the voltage is always on, and no period of time is provided in which the duty cycle or the voltage is off. As a result, data may then be embedded into a continuous or constant data stream providing a 100% band width carrier. In at least one embodiment the provision of variable and continuous voltage provides higher band width to provide pulsed LED light embedded communications/transmissions.

The provision of continuous and variable voltage in addition provides a smoother illumination dimming capability. In at least one embodiment the LED's operate at higher efficiency. In the traditional model an increase in the duration of off time provides less light accomplishing dimming of the illumination source. In at least one embodiment, the LED's are not off and dimming occurs by a reduction in the current or voltage applied to the LED's thereby reducing illumination and accomplishing dimming without terminating power to the LED's as occurs in the previously known duty cycles.

In some embodiments if the number of LED's utilized in an LED light fixture 12 is increased, then the available LED diodes may be operated at a lower intensity, however, due to the increased number of available LED's the overall desired light output is obtained. The running of an increased number of LED's at a lower intensity increases the efficiency of the LED's significantly. In at least one embodiment the amount of voltage applied to the LED's may be varied to provide a more efficient running of the diodes which results in the efficient operation of the LED's and the provision of a desired illumination level.

In at least one embodiment the illumination is provided as a service, namely as a vehicle for data communication, as opposed to the provision exclusively of illumination. In this embodiment the use of an increased number of LED light emitting diodes or units is desirable to maximize the provision of the services for data communication as well as illumination for a designated area.

In some embodiments it is desirable to obtain the most photons output based upon and the fewest electrons utilized.

In at least one embodiment the provision of variable levels of voltage or current are passed to the LED's, and the various injectors provide variable output to produce more or less voltage, increasing current and providing 100% communication capability from the diodes, while continuing to provide an option to vary and/or to dim the intensity of the illumination. In some embodiments a trade-off is required for the use of an increased number of LED's, however, the use of an increased number of LED's in some embodiments may result in an overall decreased electrical and capital expense. In certain embodiments another trade-off is present as related to the capital expense associated with the selection of injectors. In some embodiments pulse modulated intensity may provide a reduced expense because the use of a digital analog potentiometer may be obviated. In some embodiments, light conversion is higher at lower current levels. In some embodiments, a pulse modulated intensity may provide an enhanced economical approach. In at least one embodiment the use of a larger number of LED's 32 to provide illumination improves efficiency conversion, saving electricity, however, the initial capital expense may be increased because of the necessity of a larger number of LED's and the quality of the injectors.

In some embodiments, the use of a variable power supply, permits the use of two sets of diodes, or channel "A" which runs a warm set of diodes, and channel "B" which may run a cold set of diodes. The hot and cold channels may have separate voltage controls which may be identified as injectors. In some embodiments the term injectors is used synonymously with a reference to a variable power supply. In at least one embodiment, current is injected into certain LED's 32 and different current injectors are utilized for each group of LED's 32. In at least one embodiment current is being injected to groups of LED's 32 over the power supply lines on a power over Ethernet scheme in order to provide faster data transfers and improved illumination efficiencies.

In at least one embodiment as depicted in FIG. 6 through 14 current or voltage is identified on the traditional "Y" axis and the passage of time is represented on the traditional "X" axis. In some embodiments the amplitude (along the "Y" axis) of illumination or embedded LED light carrier signals is increased as the current or voltage provided to the LED's 32 is increased. Conversely the amplitude of illumination or embedded LED carrier light signals is decreased as the current or voltage provided to the LED's 32 is decreased.

In at least one embodiment a microcontroller integral to an LED light link key 10, electronic device 30, or controller

40 and LED light fixture 12 will know from memory, or recognize the operational properties and parameters for a photodiode 20 used during embedded pulsed LED light transmissions/communications. The identification or recognition of the properties/parameters for a photodiode 20 will include a sensitivity threshold detection level for a minimum amplitude and/or frequency of current/voltage required for recognition of an embedded pulsed LED light transmission/communication. In some embodiments, the current/voltage provided to the LED's 32 for transmission/communication of embedded pulsed LED light carrier signals does not drop below the sensitivity threshold detection level, therefore, the transmission/communication of embedded pulsed LED light carrier signals is continuous and uninterrupted.

In some embodiments, the sensitivity threshold detection level may vary between LED light link keys 10, electronic devices 30, and/or LED light fixtures 12, where each microcontroller or server 40 or variable power supply may increase the minimum current provided to the LED's 32 to exceed the minimum sensitivity threshold detection level.

In at least one embodiment, to accomplish a desired level or setting of illumination emitted from an LED light fixture 12, the current/voltage provided to the LED's 32 from the variable power supply or server 40 may be adjusted upwardly to provide more illumination or downwardly to provide less illumination provided that current/voltage is not reduced below the sensitivity threshold detection level which in one embodiment may be identified by reference numeral 44. In some embodiments, the variable power supply or server 40 control individual LED's 32 or group of LED's 32 within an LED light fixture 12 to provide selective wavelengths or emission levels of illumination, such as color, intensity, and/or temperature such as a warm or cool light.

In some embodiments, to accomplish a desired level or setting of illumination emitted from an LED light fixture 12, the frequency of the current/voltage provided to the LED's 32 is varied. For example, an increase in the frequency of pulsed signals will result in less time passage between adjacent pulses of embedded LED carrier signals. Conversely a reduced frequency of pulsed signals will result in more time passage between adjacent pulses of embedded LED carrier signals. In some embodiments, regardless of the frequency selected for the pulses of embedded LED carrier signals, a minimum voltage/current is provided to the LED's 32 to exceed the sensitivity threshold detection level for the photodiodes 20.

In some embodiments, a desired level of illumination may be provided by variable regulation of the amplitude of pulses of embedded LED carrier signals, the frequency of the pulses of embedded LED carrier signals, or both the amplitude and the frequency of the pulses of embedded LED carrier signals as emitted from the LED's 32. Dimming of illumination or increased illumination, as well as intensity, color and/or temperature of light is available for regulation through the variable injectors or power supplies which may be controlled by controllers or servers 40 in communication with LED light fixtures 12.

In some embodiments, the amplitude of pulses of embedded LED carrier signals may be increased and simultaneously the frequency of pulses of embedded LED carrier signals may be increased resulting in increased illumination. In some embodiments, the amplitude of pulses of embedded LED carrier signals may be increased and simultaneously the frequency of the pulses of embedded LED carrier signals may be unchanged resulting in an increase in illumination.

In some embodiments the amplitude of pulses of embedded LED carrier signals may be increased and simultaneously the frequency of pulses of embedded LED carrier signals may be decreased resulting in either an increase or a decrease in illumination dependent on the combined effect of the amplitude/frequency change.

In some embodiments, the amplitude of pulses of embedded LED carrier signals may be unchanged and simultaneously the frequency of pulses of embedded LED carrier signals may be increased resulting in an increase in illumination. In some embodiments, the amplitude of pulses of embedded LED carrier signals may be unchanged and simultaneously the frequency of pulses of embedded LED carrier signals may be decreased resulting in a decrease in illumination.

In some embodiments the amplitude of pulses of embedded LED carrier signals may be decreased and simultaneously the frequency of pulses of embedded LED carrier signals may be increased resulting in either an increase or decrease in illumination dependent on the combined effect of the amplitude/frequency change. In some embodiments the amplitude of pulses of embedded LED carrier signals may be decreased and simultaneously the frequency of pulses of embedded LED carrier signals may be unchanged resulting in a decrease of illumination. In some embodiments the decrease of both the amplitude and frequency of pulses of embedded LED carrier signals results in a decrease of illumination.

In some embodiments the amplitude or the frequency of embedded LED carrier signals may increase or decrease at a variable rate or at a constant rate.

As depicted in FIG. 6, a traditional duty cycle is shown having pulses of embedded LED carrier signals 46 of constant amplitude and frequency cycling through an off status 48. Superimposed over the traditional duty cycle is shown a sensitivity threshold detection level 44 as provided in at least one embodiment of the invention.

Figure 7:
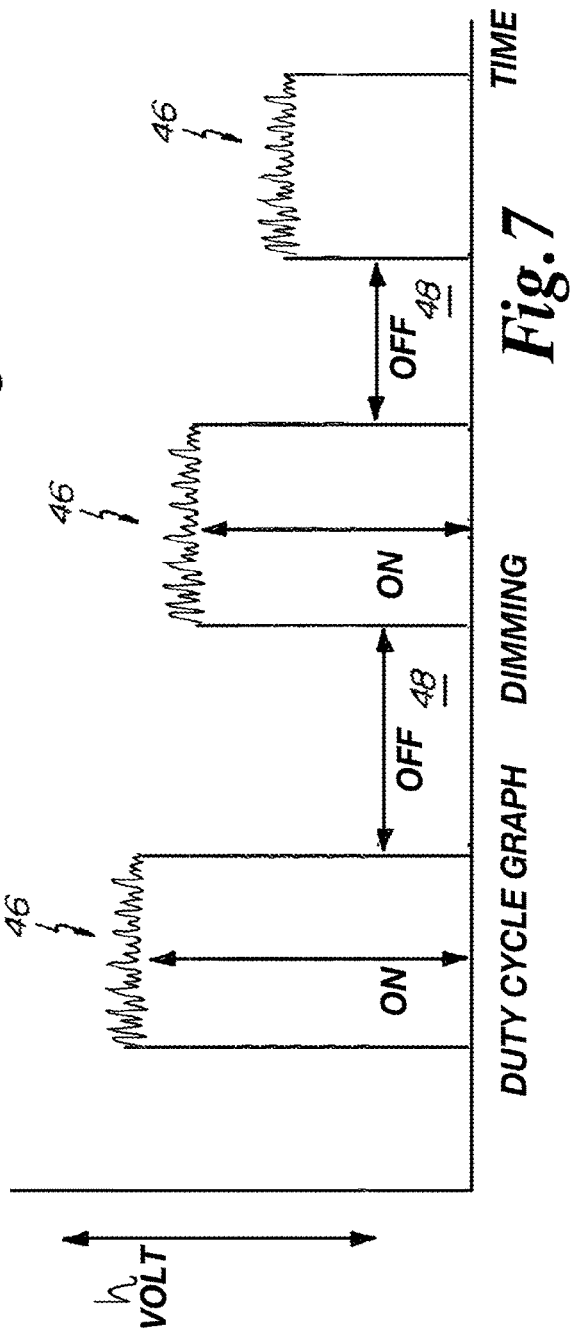
FIG. 7 is an alternative duty cycle graph.

As depicted in FIG. 7 a duty cycle is shown having pulses of embedded LED carrier signals 46 of decreasing amplitude and constant frequency cycling through an off status 48. Illumination generated from the traditional duty cycle of FIG. 7 is dimming.

As depicted in FIG. 8 a duty cycle is shown having pulses of embedded LED carrier signals 46 of constant amplitude and decreasing frequency where the time interval "A" is less than the time interval "B", and time interval "B" is less than time interval "C" resulting in the emission of reduced illumination.

As depicted in FIG. 9 a duty cycle is shown having pulses of embedded LED carrier signals 46 of decreasing amplitude and decreasing frequency. In FIG. 9 the amplitude of pulse "A" is greater than the amplitude of pulse "C" which in turn is greater than the amplitude of pulse "E". In FIG. 9 the frequency between adjacent pulses is decreasing, where the time interval "B" is greater than the time interval "D", which in turn is greater than the time interval "F". The illumination represented by the duty cycle graph of FIG. 9 is dimming.

Figure 10:
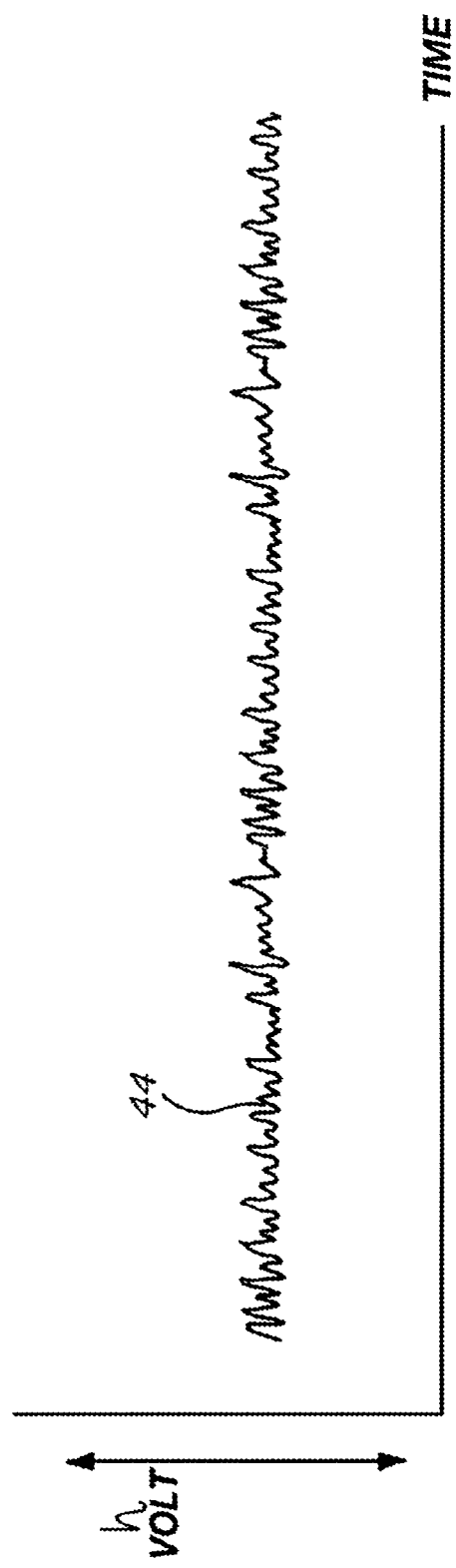
FIG. 10 is a duty cycle graph of one alternative embodiment of the invention.

In at least one embodiment as depicted in FIG. 10 a duty cycle for a continuous pulse of embedded LED carrier signals 46 having a set amplitude is shown.

Figure 11:
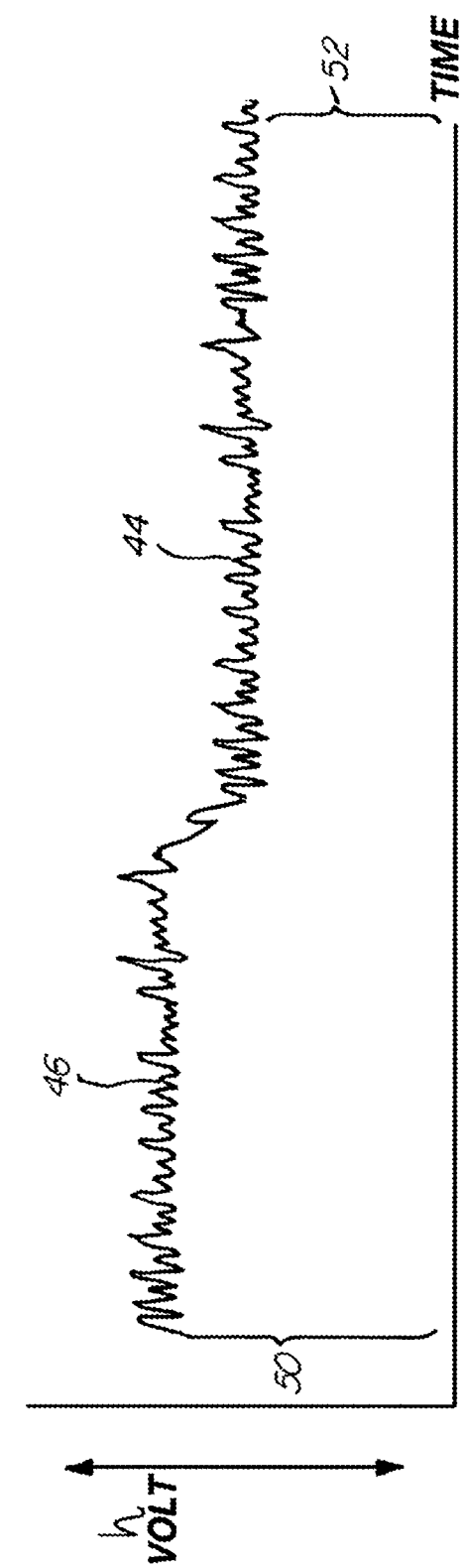
FIG. 11 is a duty cycle graph of one alternative embodiment of the invention.

In at least one embodiment as depicted in FIG. 11 a duty cycle for a continuous pulse embedded LED carrier signal 46 is shown having a first amplitude 50 and a second reduced amplitude 52. The illumination represented by the duty cycle graph of FIG. 11 is dimming. The transmission/communication of embedded LED carrier signal 46 is not interrupted and is not cycled through zero or an off status.

In at least one embodiment as depicted in FIG. 12 a duty cycle for a continuous pulsed embedded LED carrier signal 46 is shown having a decreasing amplitude between adjacent pulses and a constant frequency between adjacent pulses. As depicted in FIG. 12 sensitivity threshold detection level 44 is shown and first pulse 54 has a larger amplitude as compared to the amplitude of second pulse 56. The amplitude of second pulse 56 is also greater than the amplitude of third pulse 58. Between pulses 54, 56 and 58 a pulse at least as high as the sensitivity threshold detection level 44 is provided. It should be noted that the pulse amplitude between adjacent pulses 54, 56 and 58 may be larger than the sensitivity threshold detection level 44. The illumination depicted by the duty cycle graph of FIG. 12 is dimming.

In at least one embodiment as depicted in FIG. 13 a duty cycle for a continuous pulse embedded LED carrier signal 46 is shown having an amplitude alternating between a first level 60 and a second reduced level 62. Amplitude 62 is greater than or equal to sensitivity threshold detection level 44. As depicted in FIG. 13 the frequency between adjacent pulses is decreasing where time period "A" is shorter than time period "B", and time period "B" is shorter than time period "C". The illumination depicted by the duty cycle graph of FIG. 13 is dimming.

Figure 14:
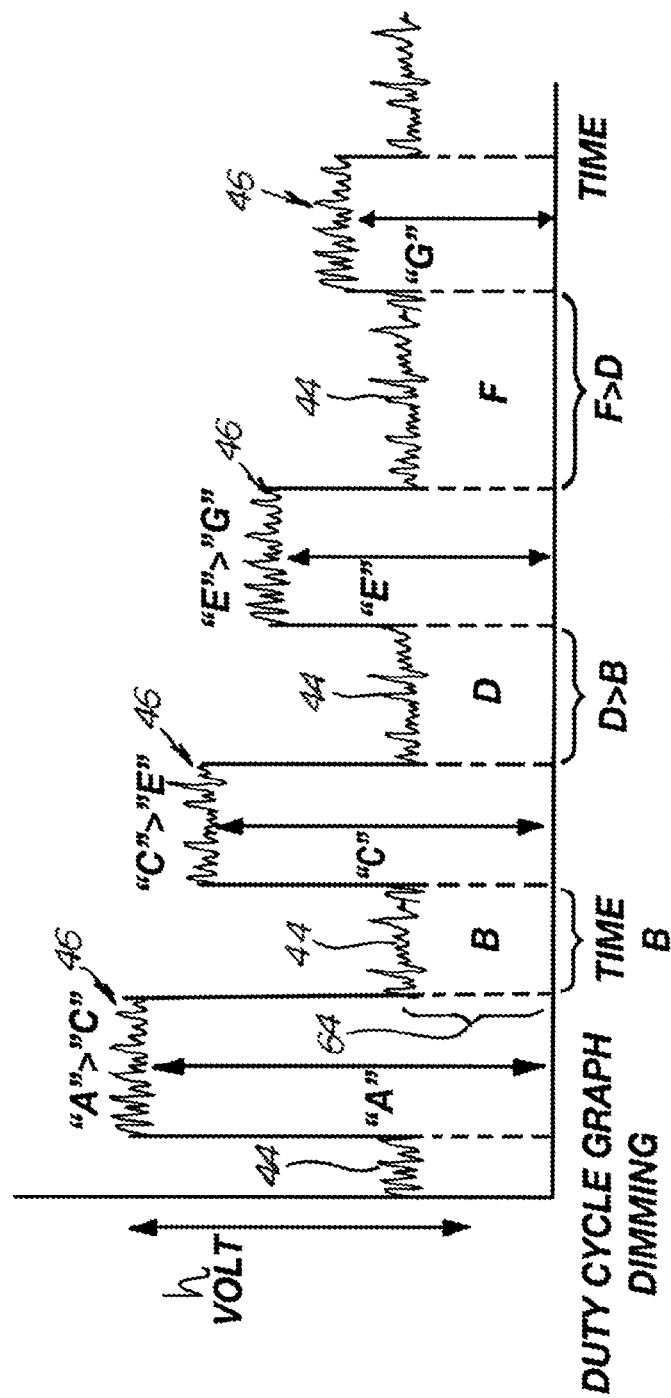
FIG. 14 is a duty cycle graph of one alternative embodiment of the invention.

In at least one embodiment as depicted in FIG. 14 the duty cycle for a continuous pulse embedded LED carrier signal 46 is shown. As depicted in FIG. 14 the amplitude of the pulses is decreasing over time, in that the amplitude "A" is greater than the amplitude of adjacent pulse "C" which in turn is greater than the amplitude of adjacent pulse "E" which is greater than the amplitude of adjacent pulse "G". A base amplitude 64 is provided between adjacent pulses where base amplitude 64 is greater than or equal to the sensitivity threshold detection level 44. As depicted in FIG. 14 the frequency is decreasing where time period "B" is shorter than time period "D" which in turn is shorter than time period "F". As depicted in FIG. 14 the pulses are getting weaker over time, and the duration of time between adjacent pulses is increasing. The illumination depicted by the duty cycle graph of FIG. 14 is dimming.

In a first embodiment a security system is disclosed comprising: a pulsed light communication device comprising at least one transmission light emitting diode, at least one photo detector, and a plurality of indicator light emitting diodes, said plurality of indicator light emitting diodes emitting at least one of a plurality of wavelengths of colored light; and a controller in communication with said at least one transmission light emitting diode, said at least one photo detector, and said plurality of indicator light emitting diodes; wherein said pulsed light communication device is in communication with at least one network, said at least one network having a network security level, said network security level being identified by at least one of said plurality of wavelengths of colored light; wherein said controller is constructed and arranged to communicate with said network and to illuminate said indicator light emitting diodes to emit said at least one wavelength of colored light identified for said network security level.

In a second embodiment according to the first embodiment, the security system further comprises a managed switch in communication with said controller.

In a third embodiment according to the second embodiment the managed switch provides at least two networks.

In a fourth embodiment according to the third embodiment each of said at least two networks have different network security levels, each of said network security levels being identified by a different wavelength of colored light.

In a fifth embodiment according to the third embodiment at least two networks are disclosed comprising a first network, said first network having a first network security level, said first network security level being identified by a first wavelength of colored light.

In a sixth embodiment according to the fifth embodiment at least two networks are disclosed comprising a second network, said second network having a second network security level, said second network security level being identified by a second wavelength of colored light.

In a seventh embodiment according to the sixth embodiment the controller is constructed and arranged to operate in a first state to illuminate said indicator light emitting diodes to emit said first wavelength of colored light.

In an eighth embodiment according to the seventh embodiment the controller is constructed and arranged to operate in a second state to illuminate said indicator light emitting diodes to emit said second wavelength of colored light.

In a ninth embodiment according to the eighth embodiment said second state represents unauthorized access to said second network.

In a tenth embodiment a security system is disclosed comprising an electronic device, said electronic device being in communication with a pulsed light communication device, said electronic device comprising a controller, at least one transmission light emitting diode, at least one photo detector, a network interface and a plurality of indicator light emitting diodes, said plurality of indicator light emitting diodes comprising light emitting diodes emitting at least one of a plurality of wavelengths of colored light, said controller being in communication with said at least one transmission light emitting diode, said at least one photo detector, and said plurality of indicator light emitting diodes, said electronic device being in communication with at least one network, said at least one network having a network security level, said network security level being identified by at least one of said plurality of wavelengths of colored light, said controller being constructed and arranged to communicate with said network and to illuminate said indicator light emitting diodes to emit said at least one wavelength of colored light identified for said network security level.

In an eleventh embodiment according to the tenth embodiment comprising a second pulsed light communication device comprising at least one second transmission light emitting diode, at least one second photo detector, and a plurality of second indicator light emitting diodes, said plurality of second indicator light emitting diodes emitting at least one of a plurality of wavelengths of colored light and a second controller in communication with said at least one second transmission light emitting diodes, said at least one second photo detector, and said plurality of second indicator light emitting diodes wherein said pulsed light communication device is in communication with said at least one network, said second controller being constructed and arranged to communicate with said network and to illuminate said second indicator light emitting diodes to emit said at least one wavelength of colored light identified for said network security level.

In a twelfth embodiment the pulsed light communication device comprises at least one transmission light emitting diode, at least one photo detector, and a controller in communication with said at least one transmission light emitting diode and said at least one photo detector, said controller generating a continuous uninterrupted modulated pulsed light emitting diode light signal transmitting information or data, said at least one photodetector having a sensitivity threshold detection level, said continuous uninterrupted modulated pulsed light emitting diode light signal having an amplitude equal to or above said sensitivity threshold detection level.

In a thirteenth embodiment according to a twelfth embodiment said information or data comprises an origination identifier.

In a fourteenth embodiment according to a thirteenth embodiment said origination identifier comprises global positioning system information.

In a fifteenth embodiment according to a fourteenth embodiment said information or data comprises a destination identifier.

In a sixteenth embodiment according to a fifteenth embodiment said destination identifier comprises global positioning system information.

In a seventeenth embodiment according to a sixteenth embodiment the controller comprises global positioning system routing system information.

In an eighteenth embodiment according to the twelfth embodiment the continuous uninterrupted modulated pulsed light emitting diode light signal has constant amplitude.

In a nineteenth embodiment according to the twelfth embodiment the continuous uninterrupted modulated pulsed light emitting diode light signal has variable amplitude.

In a twentieth embodiment according to the twelfth embodiment the continuous uninterrupted modulated pulsed light emitting diode light signal has a constant frequency.

In a twenty-first embodiment according to the twelfth embodiment the continuous uninterrupted modulated pulsed light emitting diode light signal has a variable frequency.

In a twenty-second embodiment according to the twelfth embodiment the continuous uninterrupted modulated pulsed light emitting diode light signal has constant amplitude and a constant frequency.

In a twenty-third embodiment according to the twelfth embodiment the continuous uninterrupted modulated pulsed light emitting diode light signal has variable amplitude and a variable frequency.

In a twenty-fourth embodiment according to the twelfth embodiment the continuous uninterrupted modulated pulsed light emitting diode light signal has constant amplitude and a variable frequency.

In a twenty-fifth embodiment according to the twelfth embodiment the continuous uninterrupted modulated pulsed light emitting diode light signal has variable amplitude and a constant frequency.

In a twenty-sixth embodiment according to the twelfth embodiment the controller is constructed and arranged to communicate with a network.

Applicant hereby incorporates by reference the following patent applications and issued patents: U.S. Pat. No. 6,879,263, issued Apr. 12, 2005; U.S. Pat. No. 7,046,160, issued May 16, 2006; U.S. Pat. No. 7,439,847, issued Oct. 21, 2008; U.S. Pat. No. 7,902,978, issued Mar. 8, 2011; U.S. Pat. No. 8,188,861, issued May 29, 2012; U.S. Pat. No. 8,188,878, issued May 29, 2012; U.S. Pat. No. 8,188,879, issued May 29, 2012; U.S. Pat. No. 8,330,599, issued Dec. 11, 2012; U.S. Pat. No. 8,331,790, issued Dec. 11, 2012; U.S. Pat. No. 8,542,096, issued Sep. 24, 2013; U.S. Pat. No. 8,543,505, issued Sep. 24, 2013; U.S. Pat. No. 8,571,411, issued Oct. 29, 2013; U.S. Pat. No. 8,593,299, issued Nov. 26, 2013; 12/126,227, filed May 23, 2008; 12/750,796, filed Mar. 31, 2010; 13/427,358, filed Mar. 22, 2012; 13/479,556, filed May 24, 2012; 13/706,864, filed Dec. 6, 2012; 13/927,2294, filed Aug. 21, 2013; 14/033,014, filed Sep. 20, 2013; 14/050,759, filed Oct. 10, 2013; 14/050,765, filed Oct. 10, 2013; 61/432,949, filed Jan. 14, 2011; 61/778,672, filed Mar. 13, 2013; 61/783,501, filed Mar. 14, 2013; 61/819,861, filed May 6, 2013 and 61/867,731, filed Aug. 20, 2013; 61/927,638, filed Jan. 15, 2014; 61/927,663, filed Jan. 15, 2014.

The above disclosure is intended to be illustrative and not exhaustive. The present disclosure suggests many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein, which equivalents are also intended to be encompassed by the claims. While one or more preferred embodiments have been described in detail, it will be appreciated that the present disclosure comprehends other embodiments as well. For example, while less preferred, one or more paddles may take a different form than the one or more preferred forms described in detail herein and still be comprehended by the present disclosure.

All US patents and applications and all other published documents mentioned anywhere in this application are incorporated herein by reference in their entireties.

The particular features presented in the dependent claims can be combined with each other in other manners within the scope of the present disclosure such that the present disclosure should be recognized as also specifically directed to other embodiments having any other possible combination of the features of the dependent claims.

A brief abstract of the technical disclosure in the specification is provided as well only for the purposes of complying with 37 C.F.R. 1.72. The abstract is not intended to be used for interpreting the scope of the claims.

What is claimed is:

1. A pulsed light communication device comprising:
at least one transmission light emitting diode, at least one photo detector, and a controller in communication with said at least one transmission light emitting diode and said at least one photo detector, said controller generating a continuous uninterrupted modulated pulsed light emitting diode light signal transmitting information or data, said at least one photodetector having a sensitivity threshold detection level, said continuous uninterrupted modulated pulsed light emitting diode light signal having a wavelength in the visible spectrum and having an amplitude, said amplitude alternating between a first amplitude level and a second reduced amplitude level, wherein said second reduced amplitude level is greater than a value of zero or off and wherein said second reduced amplitude level is equal to or greater than said sensitivity threshold detection level and further wherein said controller varies said amplitude to exceed said sensitivity threshold detection level based on said sensitivity threshold detection level for said at least one photodetector, and further wherein said continuous uninterrupted modulated pulsed light emitting diode light signal is formed of a plurality of pulses having a respective first amplitude level, said controller selecting at least one of a constant first amplitude level and a variable first amplitude level as said respective first amplitude level, wherein said variable first amplitude level of a pulse is not equal to a first amplitude level of another pulse.

2. The pulsed light communication device according to claim 1, wherein said information or data comprises an origination identifier.

3. The pulsed light communication device according to claim 2, wherein said origination identifier comprises global positioning system information.

4. The pulsed light communication device according to claim 3, wherein said information or data comprises a destination identifier.

5. The pulsed light communication device according to claim 4, wherein said destination identifier comprises global positioning system information.

6. The pulsed light communication device according to claim 1, wherein each of said respective first amplitude levels are the same.

7. The pulsed light communication device according to claim 3, wherein said continuous uninterrupted modulated pulsed light emitting diode light signal is formed of a plurality of pulses, each of said pulses having a frequency, wherein each of said plurality of pulses have the same frequency.

8. The pulsed light communication device according to claim 1, wherein each of said pulses has a frequency, wherein each of said respective first amplitude levels are the same and each of said frequencies are the same.

9. The pulsed light communication device according to claim 1, wherein each of said plurality of pulses has a frequency, wherein at least one of said respective first amplitude levels varies relative to another of said respective first amplitude levels and at least one of said frequencies varies relative to another of said frequencies.

10. The pulsed light communication device according to claim 1, wherein each of said plurality of pulses has a frequency, wherein each of said respective first amplitude levels are the same and at least one of said frequencies varies relative to another of said frequencies.

11. The pulsed light communication device according to claim 1, wherein each of said plurality of pulses has a frequency, wherein at least one of said respective first amplitude levels varies relative to another of said respective first amplitude levels and each of said frequencies are the same.

12. The pulsed light communication device according to claim 1, wherein each of said plurality of pulses has a frequency, wherein at least one of said frequencies varies relative to another of said frequencies.

* * * * *